United States Patent
Hiraren et al.

(10) Patent No.: US 9,513,407 B2
(45) Date of Patent: Dec. 6, 2016

(54) PHOTOCHROMIC COMPOSITION AND OPTICAL ARTICLE USING PHOTOCHROMIC COMPOSITION

(75) Inventors: Toshimitsu Hiraren, Ibaraki (JP);
Katsuhiro Mori, Ibaraki (JP);
Yasutomo Shimizu, Ibaraki (JP)

(73) Assignee: Tokuyama Corporation, Yamaguchi (JP)

( * ) Notice: Subject to any disclaimer, the term of this patent is extended or adjusted under 35 U.S.C. 154(b) by 316 days.

(21) Appl. No.: 14/112,255

(22) PCT Filed: Apr. 16, 2012

(86) PCT No.: PCT/JP2012/060272
§ 371 (c)(1),
(2), (4) Date: Oct. 17, 2013

(87) PCT Pub. No.: WO2012/144460
PCT Pub. Date: Oct. 26, 2012

(65) Prior Publication Data
US 2014/0043586 A1    Feb. 13, 2014

(30) Foreign Application Priority Data
Apr. 18, 2011   (JP) .................................. 2011-092235

(51) Int. Cl.
| | | |
|---|---|---|
| G02B 1/04 | (2006.01) | |
| C09K 9/02 | (2006.01) | |
| G02B 5/23 | (2006.01) | |
| G02C 7/10 | (2006.01) | |
| C08K 5/00 | (2006.01) | |
| C08G 18/10 | (2006.01) | |
| C08G 18/08 | (2006.01) | |
| C08G 18/12 | (2006.01) | |

(52) U.S. Cl.
CPC ................ *G02B 1/041* (2013.01); *C09K 9/02* (2013.01); *G02B 5/23* (2013.01); *G02C 7/102* (2013.01); *C08G 18/0809* (2013.01); *C08G 18/0823* (2013.01); *C08G 18/10* (2013.01); *C08G 18/12* (2013.01); *C08K 5/0041* (2013.01); *C09K 2211/1007* (2013.01); *C09K 2211/1011* (2013.01); *C09K 2211/1029* (2013.01); *C09K 2211/1033* (2013.01); *C09K 2211/1088* (2013.01); *G02F 2202/14* (2013.01); *Y10T 156/10* (2015.01)

(58) Field of Classification Search
CPC . C08G 18/0809; C08G 18/0823; C08G 18/10; C08G 18/12; G02B 1/04; G02B 5/23; C08K 5/0041; G02F 2202/14
See application file for complete search history.

(56) References Cited

U.S. PATENT DOCUMENTS

| | | | |
|---|---|---|---|
| 3,454,533 A * | 7/1969 | Trappe .................. | C08G 18/10 156/331.4 |
| 5,820,988 A | 10/1998 | Nagaoka | |
| 6,187,444 B1 * | 2/2001 | Bowles, III ........ | C08G 18/4063 428/423.1 |
| 6,367,930 B1 | 4/2002 | Santelices et al. | |
| 7,261,842 B2 | 8/2007 | Henry et al. | |
| 8,633,292 B2 | 1/2014 | Hu et al. | |
| 9,023,424 B2 * | 5/2015 | Otani ...................... | C08J 7/047 264/1.7 |
| 2002/0006505 A1 | 1/2002 | Nishizawa et al. | |
| 2003/0193044 A1 | 10/2003 | Henry et al. | |
| 2004/0012002 A1 | 1/2004 | Vassal et al. | |
| 2004/0096666 A1 | 5/2004 | Knox et al. | |
| 2005/0168690 A1 | 8/2005 | Kawai et al. | |
| 2005/0196617 A1 | 9/2005 | King | |
| 2005/0233153 A1 | 10/2005 | Qin et al. | |
| 2005/0233315 A1 | 10/2005 | Kotewicz et al. | |
| 2006/0182977 A1 | 8/2006 | Takenaka et al. | |
| 2007/0054131 A1 * | 3/2007 | Stewart ............... | C08G 18/3275 428/423.1 |
| 2007/0259117 A1 | 11/2007 | Archey et al. | |
| 2009/0312515 A1 | 12/2009 | Uchida et al. | |

(Continued)

FOREIGN PATENT DOCUMENTS

| | | |
|---|---|---|
| CN | 1208470 A | 2/1999 |
| JP | 2003-519398 A | 6/2003 |

(Continued)

OTHER PUBLICATIONS

International application No. PCT/JP2012/060272, Notification of Transmittal of Translation of the International, Preliminary Report on Patentability, dated Oct. 22, 2013.
English Abstract of JP 2006-513276.
English Abstract of JP 2008-007665.
English Abstract of JP 2005-305306.
English Abstract of JP 2005-215640.
English Abstract of JP 2005-181426.
English Abstract of JP 2003-519398.
International Application No. PCT/JP2012/060272, Informal Comments by Applicant on WO-ISA, dated Oct. 18, 2013.
English Abstract of JP 06-071833 dated Mar. 15, 1994.
English Abstract of CN 1208470.

*Primary Examiner* — Michael L Leonard
(74) *Attorney, Agent, or Firm* — Cahn & Samuels, LLP

(57) ABSTRACT

To provide a photochromic composition which functions as an adhesive layer for bonding two optical sheets that are formed of a polycarbonate resin or the like, so that a laminate that is obtained by bonding two optical sheets with the composition being sandwiched therebetween has excellent adhesion, heat resistance and photochromic properties. In particular, to provide a photochromic composition which is capable of forming an adhesive layer that is not decreased in the adhesion between the optical sheets even in cases where the adhesive layer is in contact with hot water. Provided is a photochromic composition which contains a urethane polymer having a polymerizable group (component A) and a photochromic compound (component B).

13 Claims, No Drawings

(56) References Cited

U.S. PATENT DOCUMENTS

| | | | | |
|---|---|---|---|---|
| 2009/0324956 | A1* | 12/2009 | Otani | C08J 7/047 428/412 |
| 2011/0279883 | A1* | 11/2011 | Kumar | C09B 57/00 359/241 |
| 2013/0215488 | A1 | 8/2013 | Hiraren et al. | |
| 2014/0029079 | A1 | 1/2014 | Hiraren et al. | |
| 2014/0340727 | A1 | 11/2014 | Mori et al. | |

FOREIGN PATENT DOCUMENTS

| | | |
|---|---|---|
| JP | 2004285141 A | 10/2004 |
| JP | 2005-181426 A | 7/2005 |
| JP | 2005-215640 A | 8/2005 |
| JP | 2005-305306 A | 11/2005 |
| JP | 2006-513276 A | 4/2006 |
| JP | 2008-007665 A | 1/2008 |

* cited by examiner

PHOTOCHROMIC COMPOSITION AND OPTICAL ARTICLE USING PHOTOCHROMIC COMPOSITION

This application is a U.S. national stage application of PCT/JP2012/060272 filed on 16 Apr. 2012 which claims priority of Japanese patent document 2011-092235 filed on 18 Apr. 2011, the entireties of which are incorporated herein by reference.

The present invention relates to a novel photochromic composition. Specifically, the present invention relates to a novel photochromic composition which can be suitably used as a photochromic adhesive agent for bonding optical sheets or films against each other such as made of polycarbonate resin or so. Also, the present invention relates to an optical article including a laminated structure formed by binding the optical sheets or the optical films via the adhesive sheet (layer) consisting of the photochromic composition.

BACKGROUND OF THE INVENTION

Recently, especially in United States, the needs is rapidly increasing for the lens made of plastic base material using a polycarbonate resin having excellent impact resistance, for the use of the sunglasses with a dizziness prevention property. Further, in regards with such plastic sunglass, the photochromic sunglass made of plastic (photochromic lens) is rapidly becoming popular which can control the dizziness prevention property by changing a transparency depending on the surrounding brightness by comprising a photochromic pigments.

Such photochromic lens is produced by various methods. Specifically, the method of coating a coating composition including the photochromic compound on the surface of the plastic lens, and the method of forming the lens by mixing the photochromic compound to the material of the plastic lens itself or so may be mentioned.

Also, the following method is also being considered from the point of being able to carry out a partial process, being able to form the smooth photochromic layer, and being able to provide the photochromic characteristic simultaneously with the production of the plastic lens by injection molding. That is, it is a method using the photochromic adhesive agent including the photochromic compound and the urethane polymer. Specifically, in said method, "the photochromic laminated article" of which said photochromic adhesive agent is layered on the optical sheet such as polycarbonate resin or so is produced, then said laminated article is inserted in the metal mold for the lens molding, then the injection molding or the thermocompression or so is carried out. According to this method, the photochromic sunglass made of plastic having laminated article can be produced (refer to Patent articles 1 to 4). The photochromic lens obtained by said method (the optical article) binds said laminated article and the plastic lens by the injection molding or the thermocompression; hence the adhesiveness at the boundary of the laminated article and said lens are extremely strong.

However, in the optical article produced by the method asserted in the Patent article 1 and 2, there was a problem that the optical sheet was released since the adhesiveness between the optical sheet and the photochromic adhesive agent was not sufficient, which is thought to be caused by the structure of the used urethane polymer (the adhesiveness of the photochromic laminated article itself is not sufficient, hence the optical sheet was released in some case). Further, since the heat resistance of said urethane polymer is not sufficient; in some case the optical strain or so was generated when carrying out the injection molding or the thermocompression or so. Therefore, it is in need to enhance the heat resistance of the matrix resin (the urethane polymer) of the layer formed by said adhesive agent.

On the other hand, in the method recited in Patent articles 3 and 4, it employs the 2 liquid type urethane polymer (the mixture between the compound having the isocyanate group at the end terminal and the compound having the hydroxyl group at the end terminal). In this method, the composition including the 2 liquid type urethane polymer and the photochromic compound is layered on the optical sheet, and after this layering, the 2 liquid type urethane polymer is reacted to form the urethane resin layer having high molecular weight (the adhesive agent layer). According to this method, since said composition of before layering has relatively low molecular weight, it is advantageous since the solubility of said composition itself and the solubility of the photochromic compound are not lowered. Further, the heat resistance is also enhanced since the 2 liquid type urethane polymer is reacted to form the high molecular weight urethane polymer after layering.

However, even for the photochromic composition obtained by this method, the adhesiveness of the photochromic multilayered body itself was not sufficient, and the releasing of the optical sheet was not resolved. The photochromic sunglass made of plastic is exposed under highly humidified environment, or is in contact with warm water when using in a daily life. Thus, it has to have high adhesiveness between the optical sheet and said adhesive agent even under such condition. That is, even when the photochromic layered body itself is under such condition, it is demanded that the optical sheet is strongly bonded. However, the photochromic adhesive agent obtained by reacting said 2 liquid type urethane polymer was difficult to maintain the high adhesiveness between the optical sheet and said adhesive agent after being in contact with a hot water while maintaining the high photochromic characteristic, thus there was a room for improvement.

Also, the following method is proposed which is a method for producing the lens by using "the photochromic laminated article" and it is a method other than the aforementioned injection molding or thermocompression. Specifically, it is a method of forming the plastic lens in which the photochromic laminated article is immersed into the polymerizable monomer, and said polymerizable monomer is polymerized and cured (the Patent articles 5 and 6). According to this method, by changing the type of the polymerizable monomer, the property of the obtained lens can be easily changed, thus the lens with various properties can be produced. Also, since the photochromic lens can be produced at relatively low temperature compared to the injection molding or the thermocompression, hence this method is excellent in a sense that the strain of the lens caused by the heat can be reduced.

However, according to the examination by the present inventors, by the method recited in the Patent articles 5 and 6, the followings still needed to be improved. In the Patent articles 5 and 6, as the photochromic adhesive agents, it is recited that 2 liquid type thermal curing urethane polymer formed of the urethane polymer having the isocyanate group and a curing agent was used. By using the thermal curing urethane polymer recited in the Patent articles 5 and 6, depending on the type of the polymerizable monomer and the polymerization condition, in some case the thermal curing urethane polymer and the photochromic compound eluted out to the polymerizable monomer from the photochromic laminated article. This elusion occurred at the end portion of the photochromic laminated article. The portion causing the elution of the photochromic laminated article must be removed from the lens, thus the larger the elution portion becomes, the smaller the effective area of the lens becomes. Also, when the elution portion is removed from the lens, the end face of the photochromic laminated article exist on the same face as the end face of the photochromic lens; however in case of the thermo curing urethane polymer, the adhesiveness was not sufficient in some case, and there was a chance of lens being released.

Further, the Patent article 7 discloses the method for producing the photochromic lens wherein, the photochromic urethane polymer having acryloyl group at the side chain is obtained by reacting the isocyanate compound and the diol compound having the acryloyl group under the presence of the photochromic compound, then coating this to the substrate surface. However, in the photochromic urethane polymer used in this method, the amount of said acryloyl group included therein was 210 to 400 mmol in 100 g of the photochromic urethane polymer. Thus, it is thought that due to this, the adhesiveness between the base material and the photochromic urethane polymer coated on the base material surface has insufficient adhesiveness; hence the photochromic urethane polymer was released.

[Patent Article 1] US Patent Publication No. 2004096666
[Patent Article 2] JP Patent Application Laid Open No. 2003-519398
[Patent Article 3] US Patent Publication No. 200502333153
[Patent Article 4] US Patent Publication No. 20020006505
[Patent Article 5] JP Patent Application Laid Open No. 2005-181426
[Patent Article 6] JP Patent Application Laid Open No. 2005-215640
[Patent Article 7] JP patent Application Laid Open No. 2006-513276

SUMMARY OF INVENTION

As mentioned in above, in the method for producing the photochromic lens using the photochromic laminated article, conventionally it was necessary to improve the adhesiveness between the photochromic adhesive agent (photochromic composition) and the optical sheet, and to improve the heat resistance itself. Also, it was necessary to improve the solubility resistance against the polymerizable monomer (hereinbelow it may be simply referred as the solvent resistance) which is the base material of the lens by polymerizing. The photochromic composition satisfying these properties can be used for both the production method of the photochromic lens by the injection molding and the thermocompression, and the method of embedding in the polymerizable monomer.

Therefore, the first object of the present invention is to provide the photochromic composition exhibiting excellent adhesiveness, the heat resistance, and the solvent resistance, and also exhibiting excellent photochromic property in case of using as the adhesive layer (the adhesive agent) for binding the optical sheet or the film.

Also, the second object of the present invention is to provide the optical article having excellent adhesiveness, the heat resistance and the photochromic characteristic wherein the optical article includes the laminated structure (for example, the photochromic laminated article) of which the optical sheet or film is bonded by the adhesive layer comprising the photochromic property.

Further, the third object of the present invention is to provide the method for producing the optical article without any damage to the appearance even in case of using the thermoplastic resin such as polycarbonate or so as the optical sheet or film when producing the aforementioned optical article.

In order to solve said objects, the present inventors have carried out keen examination regarding the relation between the structure of the photochromic adhesive layer and the characteristics of the obtained optical articles. As a result, they have found that the photochromic composition using the urethane polymer having the particular polymerizable group within the molecule, and having polymerizable group thereof by a particular ratio can solve said objects.

Further, by forming said photochromic adhesive layer without using the organic solvent, or by drying after forming the cast film using the organic solvent, the photochromic adhesive sheet including a particular urethane polymer in which the photochromic compound is dispersed" which becomes said photochromic adhesive layer is prepared separately, then producing the photochromic laminated article using the "photochromic adhesive sheet", in such case, the present inventors have found and achieved that the adverse effect due to the solvent can be avoided and the photochromic property does not decline.

That is, the first aspect of the present invention is, a photochromic composition comprising an urethane polymer (A) having polymerizable group within a molecule, a photochromic compound (B), and a monomer having a polymerizable group which is added depending on the needs, wherein said polymerizable group is any one selected from the group consisting of silanol group or a group capable of forming a silanol group by hydrolysis, (meth)acrylate group, epoxy group, and vinyl group, and a mol number of the polymerizable group per 100 gram of an entire component having the polymerizable group included in the photochromic composition is (1) 10 mmol or more and 250 mmol or less, in case the polymerizable group is a silanol group or a group forming the silanol group by hydrolysis;

(2) 10 mmol or more and 200 mmol or less, in case the polymerizable group is (meth)acrylate group, epoxy group, or vinyl group.

Also, in the first aspect of the present invention, preferably, said urethane polymer (A) is a prepolymer obtained by reacting;

a polyol compound (A1) of a number average molecular weight of 400 to 3000 having two or more of hydroxyl groups within a molecule, a polyisocyanate compound (A2) having two or more isocyanate groups within a molecule, a chain extender (A3) of a molecular weight of 50 to 300 having two or more groups capable of reacting with isocyanate group in a molecule, and a compound (A4) having one or two groups capable of reacting with isocyanate group within a molecule and having said polymerizable group in the molecule.

Further, the first aspect of the present invention preferably includes the polymerization initiator, the isocyanate compound (C), and the organic solvent.

The second aspect of the present invention is an optical article having a laminated structure by binding two optical sheets or optical films facing against each other via an adhesive layer obtained from said photochromic composition.

Further, the third aspect of the present invention is a production method of the optical article including a step of preparing a photochromic adhesive sheet comprising the urethane polymer (A), the photochromic compound (B), and the monomer having the polymerizable group blended depending on the needs, by removing the organic solvent (D) by drying after extending the photochromic composition on the flat and smooth base material, then further releasing the flat and smooth base material, and a step of making a laminated structure by polymerizing the polymerizable group after binding two optical sheets or the optical films by placing said photochromic adhesive sheet between the two optical sheets or the optical films facing against each other.

Effect of the Present Invention

The photochromic composition of the present invention functions as the adhesive agent or the binder. For the laminated article (the photochromic laminated article) obtained by bonding the optical sheet or the optical film made of polycarbonate resin by adhesive layer consisting of said composition, the urethane polymer having the particular polymerizable group within the molecule in a particular ratio is used; thereby excellent adhesiveness, the photochromic characteristic (the color optical density, the color fading speed, and the durability) are exhibited.

Also, since said adhesive layer shows excellent heat resistance, even in case the optical article is produced by mounting said laminated article to the metal mold, then injection molding the thermoplastic resin of polycarbonate resin to said metal mold, the adhesiveness or the photochromic characteristic are unlikely to decline and also the optical strain is unlike to occur.

Further, said photochromic laminated article is advantageous in the method of producing the lens by embedding in the polymerizable monomer forming the transparent thermoplastic resin then heat curing. That is, the adhesive layer (sheet) obtained by the photochromic composition of the present invention has enhanced solvent resistance; thus even in case it is exposed in the polymerizable monomer for long period of time, the elution of the polymer of the urethane polymer as the matrix of the adhesive layer and the photochromic compound can be suppressed. As a result, the effective area of the photochromic lens can be improved and the productivity of can be increased.

Also, according to the production method of the present invention, even in case of using the optical sheet or the film made of the thermoplastic resin such as polycarbonate or so with poor solvent resistance, the adverse effect due to the organic solvent can be avoided; hence the photochromic property is prevented from declining.

DETAILED DESCRIPTION OF THE INVENTION

The photochromic composition of the present invention is the photochromic composition including the urethane polymer (A) having the polymerizable group within the molecule (hereinafter, it may be simply referred as a component A), the photochromic compound (B) (hereinafter, it may be simply referred as a component B), and the monomer having the polymerizable group blended depending on the needs. Hereinafter, these component A and component B will be described.

(The Component A: The Urethane Polymer Having the Polymerizable Group within the Molecule)

The polymerizable group included in the urethane polymer (the component A) used in the present invention is selected from a silanol group or a group capable of forming the silanol group by hydrolysis (the group which undergoes polycondensation), (meth)acrylate group, epoxy group, and vinyl group. Hereinafter, these groups may be simply referred as "polymerizable group". Note that, the group capable of forming the silanol group by hydrolysis is alkoxysilyl group or so. Also, (meth)acrylate group refers to acrylate group or methacrylate group.

In the conventional technology, for the urethane polymer used for the photochromic adhesive agent, a reactive urethane polymer having isocyanate group (prepolymer) and prepolymer having the group capable of reacting with the isocyanate group (polyol) were mixed and the coating membrane was formed, then both were reacted to obtain the high molecular weight material. However, the adhesive layer obtained by this method had a problem such as insufficient adhesiveness, heat resistance, and solvent resistance. Further, the isocyanate group is highly reactive, and reacts with water in the atmosphere, hence in some case, the polymers of the object were not able to obtain, and the physical property of the obtained adhesive layer varied in some case. Also, the reactive urethane polymer having the isocyanate group needed to improve the storage stability for such reason.

On the contrary, the urethane polymer (the component A) used in the present invention having a polymerizable group selected from a group consisting of the silanol group or the group capable of forming the silanol group by hydrolysis, (meth)acrylate group, epoxy group, and vinyl group. Further, these polymerizable groups are speculated to form urethane polymer having the a crosslinking structure by polymerizing when forming the adhesive layer (sheet) from the photochromic composition, and when binding the optical sheet or the optical film against each other by said adhesive sheet. As a result, the polymer of the component A which is the main component of the adhesive layer improves the heat resistance and the solvent resistance thereby the above mentioned problems are thought to be solved. Further, the component A, although it will be described in below, is relatively stable at ambient temperature, and the polymerization can be initiated by heat source or the light source under the presence of the initiator, hence the physical property can be controlled easily.

In the component A, the number of the polymerizable group is preferably two or more within one molecule of urethane polymer, and particularly preferably 2 or more and 5 or less from the point of exhibiting excellent effect.

This component A is not particularly limited, however it is preferably produced by the following method. Specifically, from the point of the heat resistance, the solvent resistance, the adhesiveness, and the photochromic characteristics, the component A is produced by reacting;

(A1) a polyol compound of number average molecular weight 400 to 3000 having two or more of hydroxyl groups within the molecule (hereinafter it may be simple referred as "the component A1"), (A2) a polyisocyanate compound having two or more of isocyanate groups within the molecule (hereinafter, it may be simply referred as "the component A2"), (A3) a chain extender of a molecular weight of 50 to 300 having two or more groups capable of reacting with isocyanate groups within the molecule (hereinafter, it may be simply referred as "the component A3"), and (A4) a compound having one or two groups capable of reacting with isocyanate group within the molecule, and having said polymerizable group within the molecule (hereinafter, it may be simply referred as "the component A4").

By using the component A4, the urethane polymer (A) having the polymerizable group can be produced. Hereinafter, these components will be described.

(The Component A1: The Polyol Compound)

The polyol compound of the component A1 preferably has two to six hydroxyl groups within the molecule in order to suppress the urethane polymer having the polymerizable group (the component A) from becoming highly crosslinked body. Further, considering the solubility to the organic solvent, said hydroxyl groups are preferably two to three.

The number average molecular weight of the component A1 is preferably 400 to 3000. This component A1 is a polymer, thus the molecular weight is shown by number average molecular weight. More preferably the number average molecular weight is 400 to 2500 and further preferably it is 400 to 1500 from the point of the heat resistance, and the photochromic characteristic (the color optical density, the color fading speed, the weather resistance or so) of the obtained component A, and particularly from the point of the weather resistance of the photochromic compound.

Also, as for the component A1, known polyol compound can be used without any particular limitation. Specifically, the polyol compounds such as polyether polyol, polycarbonate polyol, polycaprolactone polyol, polyester polyol or so are preferably used. These may be used alone or by combining two or more thereof. Among these, polycarbonate and polycaprolactone are preferably used from the point of the heat resistance, the adhesiveness, the weather resistance, and the hydrolysis resistance or so. Hereinafter, various compound used as the component A1 will be described in detail.

(Polyether Polyol)

As for the polyether polyol used as the component A1, the polyether polyol obtained by the reaction between "the compound having two or more active hydrogen containing groups within the molecule" and "alkyleneoxide", and the polymer polyol which is the modified body of said polyether polyol, urethane modified polyether dipolyol, polyetherester copolymer polyol or so may be mentioned.

Note that, as said "compound having two or more active hydrogen containing groups within the molecule", water, ethylene glycol, propylene glycol, butane diol, glycerin, trimethylol propane, hexanetriol, triethanol amine, diglycerin, pentaerythritol, trimethylol propane, hexane triol or so may be mentioned. These may be used alone, or by combining two or more thereof. Also, as said "alkyleneoxide", the cyclic ether compound such as ethylene oxide, propylene oxide, tetrahydrofurane or so may be mentioned. These may be used alone or by combining two or more thereof.

Such polyether polyol can be obtained as a chemical reagent or as for the industrial use, and as for the commercially available examples, "EXENOL™" series and "EMULSTAR™" made by ASAHI GLASS CO., Ltd, "ADEKA POLYETHER" series made by ADEKA CORPORATION or so may be mentioned.

(Polycarbonate Polyol)

As for polycarbonate polyol used as the component A1; polycarbonate polyol obtained by phosgenation of one or more of low molecular polyols such as ethylene glycol, 1,2-propanediol, 1,3-propanediol, 1,2-butanediol, 1,3-butanediol, 1,4-butanediol, 1,5-pentanediol, 1,6-hexanediol, 1,8-octanediol, 1,9-nonanediol, 3-methyl-1,5-pentanediol, 2-ethyl-4-butyl-1,3-propanediol, diethyleneglycol, dipropyleneglycol, neopentylglycol, cyclohexane-1,4-diol, cyclohexane-1,4-dimethanol, dimer acid diol, ethylene oxide adduct or propylene oxide adduct of bisphenol A, bis(β-hydroxyethyl)benzene, xylylene glycol, glycerin, trimethylolpropane, pentaerythritol or so; or polycarbonate polyol obtained by ester exchange method from ethylenecarbonate, diethylcarbonate, and diphenylcarbonate or so may be mentioned.

These polycarbonate polyol can be obtained as a chemical reagent or as for industrial use, and as for the commercially available examples, "DURANOL™" series made by Asahi Kasei Chemicals Corporation, "Kuraray Polyol™" series made by KURARAY CO., LTD, "Praccel™" series made by DAICEL CORPORATION, "NIPPOLAN™" series made by NIPPON POLYURETHANE INDUSTRY CO., LTD, "ETERNACOLL™" series made by UBE INDUSTRIES LTD or so may be mentioned.

As for the component A1 of the present invention, from the point of the heat resistance, the adhesiveness, the weather resistance and the hydrolysis resistance or so, it is preferable to use polycarbonate polyol. Particularly, in case of producing the laminated article by bonding the optical sheet or film made of polycarbonate resin, the adhesive layer and the adherend layer comprises the same skeletal structure, and the adhesiveness is stabilized by improving the affinity thus it is preferable to use the component A1 using polycarbonate polyol.

(Polycaprolactone Polyol)

As polycaprolactone polyol used for the component A1, the compound obtained by ring-opening polymerization of ε-caprolactone can be used.

These polycaprolactone polyol can be obtained as a chemical reagent or as for the industrial use, and as for the commercially available example; "Praccel™" series made by DAICEL CORPORATION may be mentioned.

(Polyester Polyol)

As polyester polyol used for the component A1, polyester polyol obtained by condensation reaction between "polyvalent alcohol" and "polybasic acid" or so may be mentioned. Here, as said "polyvalent alcohol", ethyleneglycol, 1,2-propanediol, 1,3-butanediol, 1,4-butanediol, 3-methyl-1,5-pentanediol, 1,6-hexanediol, 3,3'-dimethylolheptane, 1,4-cyclohexanedimethanol, neopentylglycol, 3,3-bis(hydroxymethyl)heptane, diethyleneglycol, dipropyleneglycol, glycerin, trimethylolpropane or so may be mentioned; and these may be used alone or by combining two or more thereof. Also, as said "polybasic acid", succinic acid, adipic acid, azelaic acid, sebacic acid, dodecanedicarboxylic acid, cyclopentanedicarboxylic acid, cyclohexanedicarboxylic acid, orthophthalic acid, isophthalic acid, terephthalic acid, naphthalenedicarboxylic acid or so may be mentioned; and these may be used alone or by combining two or more thereof.

These polyester diol can be obtained as a chemical reagent or as for the industrial use, and as for the commercially available example; "POLYLITE™" series made by DIC Corporation, "NIPPOLAN™" series made by NIPPON POLYURETHANE INDUSTRY CO., LTD, "MAXIMOL™" series made by KAWASAKI KASEI CHEMICALS LTD or so may be mentioned.

(The Component A2: Polyisocyanate Compound)

As "the polyisocyanate compound having two or more isocyanate group in the molecule" which is used as the component A2 in the present invention, an aliphatic polyisocyanate compound, an alicyclic polyisocyanate compound, an aromatic polyisocyanate compound, and the mixture thereof may be used. Among these, from the point of the weather resistance, it is preferable to use at least one polyisocyanate compound selected from the group consisting of the aliphatic polyisocyanate compound and the alicyclic polyisocyanate compound. Also, particularly from the point of improving the weather resistance, it is preferable that at least one polyisocyanate compound selected from the group consisting of the aliphatic polyisocyanate compound and the alicyclic polyisocyanate compound is 30 mass % or more and particularly 50 mass % or more of the polyisocyanate compound of the component A2. As for the most preferable embodiment, 100 mass % of the component A2 is at least one polyisocyanate compound selected from the group consisting of the aliphatic polyisocyanate compound and the alicyclic polyisocyanate compound.

In the polyisocyanate compound of the component A2, the number of the isocyanate group included within the molecule may be two or more. Note that, considering the solubility of the obtained urethane polymer (the component A), the number of the isocyanate group included within the molecule is preferably two. In case the polyisocyanate compound having three or more of the isocyanate groups within the molecule is mainly used, the crosslinking density of the obtained urethane polymer (the component A) becomes high, and the solubility to the organic solvent tends to decline.

For examples of polyisocyanate compound suitably used for the component A2, the aliphatic polyisocyanate compounds such as diethylene diisocyanate, tetramethylene-1,4-diisocyanate, hexamethylene-1,6-diisocyanate, octamethylene-1,8-diisocyanate, 2,2,4-trimethylhexane-1,6-diisocyanate or so; the alicyclic polyisocyanate compound such as cyclobutane-1,3-diisocyanate, cyclohexane-1,3-diisocyanate, cyclohexane-1,4-diisocyanate, 2,4-methylcyclohexyl diisocyanate, 2,6-methylcyclohexyl diisocyanate, isophorone diisocyanate, norbornene diisocyanate, isomer mixture of dicyclehexylmethane 4,4'-diisocyanate, hexahydrotoluene-2,4-diisocyanate, hexahydrotoluene-2,6-diisocyanate, hexahydrophenylene-1,3-diisocyanate, hexahydrophenylene-1,4-diisocyanate, 1,9-diisocyanato-5-methylnonane, 1,1-bis(isocyanatomethyl)cyclohexane, 2-isocyanato-4-[(4-isocyanatocyclohexyl)methyl]-1-methylcyclohexane, 2-(3-isocyanatopropyl)cyclohexylisocyanate or so; the aromatic polyisocyanate compound such as phenylcyclohexylmethane diisocyanate, isomer mixture of 4,4'-methylenebis(phenylisocyanate), toluene-2,3-diisocyanate, toluene-2,4-diisocyanate, toluene-2,6-diisocyanate, phenylene-1,3-diisocyanate, phenylene-1,4-diisocyanate, 1,3-bis(isocyanatomethyl)benzene, xylylene diisocyanate, tetramethylxylylene diisocyanate, naphthalene diisocyanate, diphenylether diisocyanate, 1,3-diisocyanatomethylbenzene, 4,4'-diisocyanato-3,3'-dimethoxy(1,1'-biphenyl), 4,4'-diisocyanato-3,3'-dimethylbiphenyl, 1,2-diisocyanatobenzene, 1,4-bis(isocyanatomethyl)-2,3,5,6-tetrachlorobenzene, 2-dodecyl-1,3-diisocyanatobenzene, 1-isocyanato-4-[(2-isocyanatocyclohexyl)methyl]2-methylbenzene, 1-isocyanato-3-[(4-isocyanatophenyl)methyl]-2-methylbenzene, 4-[(2-isocyanatophenyl)oxy]phenylisocyanate or so may be mentioned.

Among these, from the point of the weather resistance of the obtained photochromic composition, as aforementioned, it is preferable that at least one of the polyisocyanate compound selected from the group consisting of the aliphatic polyisocyanate compound and the alicyclic polyisocyanate compound is 30 mass % or more and particularly 50 mass % or more of the polyisocyanate compound of the component A2. As specific examples of preferable compounds, tetramethylene-1,4-diisocyanate, hexamethylene-1,6-diisocyanate, octamethylene-1,8-diisocyanate, 2,2,4-trimethylhexane-1,6-diisocyanate, cyclobutane-1,3-diisocyanate, cyclohexane-1,3-diisocyanate, cyclohexane-1,4-diisocyanate, 2,4-methylcyclohexyl diisocyanate, 2,6-methylcyclohexyl diisocyanate, isophorone diisocyanate, norbornene diisocyanate, isomer mixture of dicyclohexylmethane 4,4'-diisocyanate, hexahydrotoluene-2,4-diisocyanate, hexahydrotoluene-2,6-diisocyanate, hexahydrophenylene-1,3-diisocyanate, hexahydrophenylene-1,4-diisocyanate or so may be mentioned. These polyisocyanate compounds may be used alone or by combining two or more thereof.

Also, this polyisocyanate compound may be the compound having the polymerizable group, described in below, within the molecule. This polymerizable group is a group selected from the group consisting of a silanol group or a group capable of forming the silanol group by hydrolysis, a (meth)acrylate group, an epoxy group, and a vinyl group. Note that, in case the polymerizable group is a silanol group, it reacts with the isocyanate group which becomes difficult to control, hence it is preferably a group capable of forming the silanol group by hydrolysis such as alkoxy group or so.

The production method of the compound will be described using the diisocyanate group having the group capable of forming the silanol group by hydrolysis as the example. As the diisocyanate compound, the reaction product of the triisocyanate compound having three isocyanate group within the molecule, and the compound having the group (an amino group, a hydroxyl group, a carboxyl group, or a thol group or so) capable of reacting with one isocyanate group within the molecule and the group capable of forming the silanol group by hydrolysis may be mentioned. As the triisocyanate compound, 1,3,6-hexamethylenetriisocyanate, 1,8-diisocyanato-4-isocyanatomethyloctane, 2-isocyanatoethyl(2,6-diisocyanato)hexanoate, 1-methylbenzene-2,4,6-triisocyanate, diphenylmethane-2,4,4'-triisocyanate, triphenylmethane-4,4',4"-triisocyanate, and 1,6,11-undecanetriisocyanate or so may be mentioned. Also, as the compound having the group capable of reacting with one isocyanate group within the molecule and the group capable of forming the silanol group by hydrolysis, the compound shown by the below formula (1) may be mentioned. By reacting the isocyanate group of said triisocyanate compound with, for example, the group capable of reacting with one isocyanate group of the compound shown in general formula (1), the compound (diisocyanate compound) having two isocyanate groups and the group capable of forming the silanol group by hydrolysis within the molecule can be obtained.

Also, as the compound to react with said triisocyanate compound, the compound having the group capable of reacting with one isocyanate group within the molecule, and a polymerizable group such as a (meth)acrylate group, an epoxy group, or a vinyl group or so can be used as well. By using these compounds, the diisocyanate compound having a (meth)acrylate group, an epoxy group, or a vinyl group is made.

Note that, by using the diisocyanate compound having the polymerizable group mentioned in the above as the component A2, the component A having the polymerizable group can be made. Therefore, as the component A2, in case of using the diisocyanate compound having the polymerizable group, the component A4 (the polymerizable group imparting group) described in below may or may not be used.

These diisocyanate compounds may be used alone or by combining two or more thereof.

(The Component A3: The Chain Extender)

The chain extender used as the component A3 is a compound with molecular weight of 50 to 300 and having two or more groups capable of reacting with the isocyanate group within the molecule. Note that, since the chain extender is not a polymer, the molecular weight refers to the molecular weight of the chain extender itself The component A3 functions as the chain extender when making the urethane polymer (A). By using the component A3, it enables the molecular weight of urethane polymer (A) having the polymerizable group of the present invention to control the heat resistance and the photochromic characteristics or so. When the molecular weight of the chain extender is less than 50, the obtained urethane polymer tends to be too hard. Also, although the heat resistance of the obtained photochromic composition improves the photochromic characteristics, the adhesiveness tends to decline. On the other hand, in case the molecular weight of the chain extender exceeds 300, the obtained urethane polymer (A) tends to be too soft. Therefore, all of the heat resistance, the adhesiveness, and the photochromic characteristic of the obtained photochromic composition tend to decline. As mentioned in above, the molecular weight of the chain extender is more preferably 50 to 250 and further preferably 55 to 200.

The component A3 is preferably at least one chain extender selected from the group consisting of a diamine compound, a triamine compound, an amino alcohol compound, amino carboxylic acid compound, an amino thiol compound, a diol compound, and a triol compound. Hereinafter, the diamine compound, the triamine compound, the amino alcohol compound, the amino carboxylic acid compound, the amino thiol compound may be referred as an amino group containing compound. The amino group containing compound having the group reacting with at least two or more of the isocyanate group in the molecule, and among these, at least one is amino group (—$NH_2$, or NH(R), and R is the substituent group). The reactive group with the isocyanate group other than amino group is a hydroxyl group (—OH group), a mercapto group (—SH group: thiol group), carboxyl group [—C(=O)OH group], or acid chloride group [—C(=O)OCl group].

For the examples of the compound suitably used as the amino group containing compound of the component A3, as the diamine compound and the triamine compound, isophoronediamine, ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, piperidine, N,N-bis-(2-aminoethyl)piperidine, bis-(4-aminocyclohexyl)methane, bis-(4-amino-3-butylcyclohexyl)methane, 1,2-, 1,3- and 1,4-diaminocyclohexane, norbornanediamine, hydrazine, dihydrazine adipate, phenyldiamine, 4,4'-diphenylmethandiamine, N,N'-diethylethylenediamine, N,N'-dimethylethylenediamine, N,N'-dipropylethylenediamine, N,N'-dibutylethylenediamine, N-methylethylenediamine, N-ethylethylenediamine, bis(hexamethylene)triamine, 1,2,5-pentatriamine or so may be mentioned.

Also, as amino alcohol, 2-aminoethanol, 3-aminopropanaol, 4-aminobutanol, 5-aminopentanol, 6-aminohexanol, 2-piperidinemethanol, 3-piperidinemethanol, 4-piperidinemethanol, 2-piperidineethanol, 4-piperidineethanol or so may be mentioned.

As for aminocarboxylic acid, glycine, alanine, lysine, leucine or so may be mentioned.

As the amino thiol, 1-aminotihol, 2-aminoethane thiol or so may be mentioned.

Also as the examples suitably used as the diol compound and the triol compound of the component A3, ethyleneglycol, 1,2-propanediol, 1,3-propanediol, 1,2-butanediol, 1,3-butanediol, 1,4-butanediol, 1,3-pentanediol, 2,4-pentanediol, 1,5-pentanediol, 2,2,4-trimethyl-1,3-pentanediol, 2-methyl-1,3-pentanediol, 2,5-hexanediol, 1,6-hexanediol, 2,4-heptanediol, 2-ethyl-1,3-hexanediol, 2,2-dimethyl-1,3-propanediol, 1,8-octanediol, 1,9-nonanediol, 1,10-decanediol, 1,4-cyclohexanediol, 1,4-cyclohexanedimethanol, 1,2-bis(hydroxyethyl)-cyclohexane, diethyleneglycol, triethyleneglycol, tetraethyleneglycol, dipropyleneglycol, tripropyleneglycol, neopentylglycol, and trimethylolpropane or so may be mentioned.

The chain extenders of above mentioned amino group containing compound, the diol compound and triol compound or so may be used alone or by combining two or more thereof.

For said chain extender, from the point of the heat resistance, the adhesiveness, and the durability of the photochromic compound, the amino group containing compound is preferably used and particularly the diamine compound is more preferably used. This is because when producing the component A, by using the amino group containing compound, the urethane polymer (the component A) will comprise an urea bond, hence the rigidity of the molecule increase and also the hydrogen bond between the molecular chain becomes stronger. As a result, the heat resistance of the photochromic composition is thought to be improved. Also, in regards with the improvement of the durability of the photochromic compound, by having stronger hydrogen bond between the molecular chain due to the presence of the urea bond, the oxygen in the air becomes difficult to disperse into the urethane polymer (the component A), thereby the photooxidized degradation known as the general degradation system of photochromic compounds is thought to be suppressed. Further, in regards with the improvement of the adhesive strength, it is thought that the aggregation corruption of the resin has become difficult to occur, since the hydrogen bond between the molecule has become stronger due to the presence of the urea bond.

Also, for the chain extender, the compound capable of introducing the polymerizable group such as shown by the below general formula of (5), (6), (7), and (8) or so to the side chain can be used as well. Therefore, as the component A3, in case of using the chain extender having the polymerizable group as mentioned in above, the component A4 (the polymerizable group imparting compound) described in below may or may not be used.

(The Component A4: The Compound Having One or Two Groups Capable of Reacting with the Isocyanate Group and a Polymerzable Group in the Molecule (the Polymerizable Group Imparting Compound))

The present invention improves the crosslinking density of urethane polymer forming the photochromic adhesive sheet (the layer) by using the urethane polymer (A) having the polymerizable group. Therefore, along with the improvement of the heat resistance and the solvent resistance of said urethane polymer, the durability of the photochromic compound and the adhesiveness with the optical sheet and the photochromic adhesive sheet (layer) can be improved as well.

The component A4 is the compound having one or two groups capable of reacting with the isocyanate group and the polymerizable group within the molecule (the polymerizable group imparting compound). The group capable of reacting with the isocyanate group is selected from the group consisting of an amino group (—$NH_2$ group), a hydroxyl group (—OH group), a mercapto group (—SH group), a carboxyl group [—C(=O)OH group], or an acid chloride group [—C(=O)OCl group].

Said polymerizable group is a group selected from the group consisting of a silanol group or a group capable of forming the silanol group by hydrolysis, a (meth)acrylate group, an epoxy group, and a vinyl group. The polymerizable group can be introduced to urethane polymer (A) by using the component A4 having at least one or more of said polymerizable groups within the molecule. Hereinafter, various compounds used as the component A4 will be described in detail. First, the compound which can introduce the polymerizable group to the end terminal of urethane polymer (A) will be described.

(The Polymerizable Group Imparting Compound which can Introduce the Polymerizable Group at the End Terminal of Urethane Polymer (the Component A4)) (the Polymerizable Group Imparting Compound Introducing the Silanol Group or the Group Capable of Forming the Silanol Group by Hydrolysis)

As such compound, the compounds shown in the below general formula (1) may be mentioned.

[Chemical formula 1]

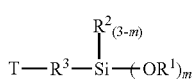

(1)

(in the formula, $R^1$ is a hydrogen atom, or the alkyl group having a carbon atoms of 1 to 5, $R^2$ is the alkyl group having the carbon atoms of 1 to 5, $R^3$ is the alkylene group having the carbon atoms of 1 to 20, or the polymethylene group having the carbon atoms of 3 to 20, T is the group capable of reacting the isocyanate group, and m is an integer of 1 to 3).

In the above mentioned general formula (1), $R^1$ is a hydrogen atom, or the alkyl group having carbon atoms of 1 to 5. Among these, considering the storage stability and the handling property of the obtained photochromic composition, the alkyl group having carbon atoms of 1 to 5 is preferable. Particularly, a methyl group or an ethyl group is preferable.

$R^2$ is the alkyl group having the carbon atoms of 1 to 5, and particularly, a methyl group or an ethyl group is preferable.

$R^3$ is the alkylene group having the carbon atoms of 1 to 20, or the polymethylene group having the carbon atoms to 3 to 20; and preferably it is the alkylene group having the carbon atoms of 1 to 10 or the polymethylene group having the carbon atoms of 3 to 10.

T is the group capable of reacting with the isocyanate group, and it is an amino group, a hydroxyl group, a carboxyl group, or a thiol group. Among these, from the point of the reactivity with the isocyanate group, and the easiness to obtain, the amino group is suitable.

m is an integer of 1 to 3, and it is preferably 2 or 3 since the crosslinking density of the polyurethane resin layer (the adhesive layer) formed by urethane polymer (A) improves.

As the example of the compound shown in said general formula (1), aminoalkyltrialkoxysilane such as aminomethyltrimethoxysilane, aminomethyltriethoxysilane, β-aminoethyltrimethoxysilane, β-aminoethyltriethoxysilane, γ-aminopropyltrimethoxysilane, γ-aminopropyltriethoxysilane, γ-aminopropyltripropoxysilane, γ-aminopropyltriisopropoxysilane, γ-aminopropyltributoxysilane or so; (aminoalkyl)alkyldialkoxy silane such as β-aminoethylmethyldimethoxysilane, β-aminoethylmethyldiethoxysilane, γ-aminopropylmethyldimethoxysilane, γ-aminopropylmethyldiethoxysilane, γ-aminopropylmethyl-propoxysilane or so and aminoalkyldialkyl(mono)alkoxysilane corresponding to thereof or so may be mentioned.

Also, mercaptoalkyltrialkoxysilane such as mercaptomethyltrimethoxysilane, mercaptomethyltriethoxysilane, β-mercaptoethyltrimethoxysilane, β-mercaptoethylethoxysilane, γ-mercaptopropyltrimethoxysilane, γ-mercaptopropyltriethoxysilane, γ-mercaptopropyltripropoxysilane, γ-mercaptopropyltriisopropoxysilane, γ-mercaptopropyltributoxysilane or so; (mercaptoalkyl)alkyldialkoxysilane such as β-mercaptoethylmethyldimethoxysilane, β-mercaptoethylmethyldiethoxysilane, γ-mercaptopropylmethyldimethoxysilane, γ-mercaptopropylmethyldiethoxysilane, γ-mercaptopropylmethyldipropoxysilane or so; and mercaptoalkyldialkyl(mono)alkoxysilane corresponding to thereof or so may be mentioned.

(The Polymerization Group Imparting Compound Introducing a (Meth)Acrylate Group to the End Terminal)

As for this compound, the compound shown in the below general formula (2) may be mentioned.

[Chemical formula 2]

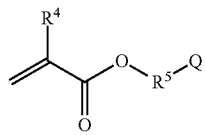

(2)

(In the formula, $R^4$ is a hydrogen atom or a methyl group, $R^5$ is the alkylene group having the carbon atoms of 1 to 20, or the polymethylene group having the carbon atoms of 3 to 20, and Q is the group capable of reacting with the isocyanate group).

In said general formula (2), $R^4$ is a hydrogen atom or a methyl group.

Also, $R^5$ is the alkylene group having the carbon atoms of 1 to 20, or the polymethylene group having the carbon atoms of 3 to 20 and preferably it is the alkylene group having the carbon atoms of 1 to 10 or the polymethylene group having the carbon atoms of 3 to 10.

Q is the group capable of reacting with the isocyanate group, and the amino group, the hydroxyl group, the carboxyl group, or the thiol group or so may be mentioned; however from the point of the stability of the compound, the hydroxyl group is suitable.

As for the examples of the compound shown in said general formula (2), acrylate mono-ol such as 2-hydroxyethylacrylate, 3-hydroxypropylacrylate, 4-hydroxybutylacrylate, 1,6-hexanediolmonoacrylate or so; methacrylate mono-ol such as 2-hydroxyethylmethacrylate, 3-hydroxypropylmethacrylate, 4-hydroxybutylmethacrylate, 1,6-hexanediolmonomethacrylate or so may be mentioned.

(The Polymerizable Group Imparting Compound Introducing the Epoxy Group to the End Terminal)

As for such compound, the compound shown in the following general formula (3) may be mentioned.

[Chemical formula 3]

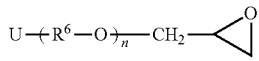

(3)

(In the formula, $R^6$ is the alkylene group having the carbon atoms of 1 to 20, or the polymethylene group having the carbon atoms of 3 to 20, n is an integer of 0 to 3, and U is the group capable of reacting with the isocyanate group).

In said general formula (3), $R^6$ is the alkylene group having the carbon atoms of 1 to 20, or the polymethylene group having the carbon atoms of 3 to 20 and preferably it is the alkylene group having the carbon atoms of 1 to 10 or the polymethylene group having the carbon atoms of 3 to 10.

Also, n is an integer of 0 to 3, and preferably it is an integer of 0 or 1. Particularly, when n is 0, U is directly bonded to a methylene group.

U is the group capable of reacting with the isocyanate group, and it may be the amino group, the hydroxyl group, the carboxyl group or the thiol group; however from the point of easiness to obtain, it is preferably the hydroxyl group.

The compound shown in said general formula (3) can be prepared by reacting, for example, divalent alcohol and epichlorohydrin. The preparation method according to the present invention is not particularly limited, however in any preparation, 1 mol of epichlorohydrin is bonded against 1 mol of divalent alcohol. During the reaction of the divalent alcohol and epichlorohydrin, the corresponding by-product is produced; however it can be separated by a conventional separation method.

As the examples of the compound shown in said general formula (3), glycidol, butanediolmonoglycidylether, hexanediolmonoglycidyl ether, cyclohexanedimethanolglycidylether or so may be mentioned.

(The Polymerizable Group Imparting Compound Introducing the Vinyl Group to the End Terminal)

As for such compound, the compound shown in the following general formula (4) may be mentioned.

$$V-R^7-$$ [Chemical formula 4]

(In the formula, $R^7$ is the alkylene group having the carbon atoms of 1 to 20, or the polymethylene group having the carbon atoms of 3 to 20, and V is a group capable of reacting with the isocyanate group).

In said general formula (4), $R^7$ is the alkylene group having the carbon atoms of 1 to 20, or the polymethylene group having the carbon atoms of 3 to 20 and preferably it is the alkylene group having the carbon atoms of 1 to 10 or the polymethylene group having the carbon atoms of 3 to 10.

V is the group capable of bonding with the isocyanate group, and it may be the amino group, the hydroxyl group, the carboxyl group or the thiol group; however from the point of easiness to obtain, it is preferably the hydroxyl group.

As for the examples shown in said general formula (4), allylalcohol or so may be mentioned.

Next, the compound capable of introducing the polymerizable group to the side chain of urethane polymer (A) will be explained.

(The Polymerizable Group Imparting Compound Capable of Introducing the Polymerizable Group to the Side Chain of Urethane Polymer (A4)) (the Polymerizable Group Imparting Compound Introducing the Silanol Group or the Group Forming the Silanol Group by Hydrolysis to the Side Chain)

As such compound, the compound shown in the following general formula (5) or (6) may be mentioned.

[Chemical formula 5]

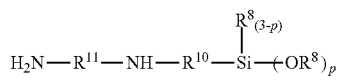

(5)

(In the formula, $R^8$ is a hydrogen atom, or the alkyl group having a carbon atoms of 1 to 5, $R^9$ is the alkyl group having the carbon atoms of 1 to 5, $R^{10}$ and $R^{11}$ are the alkylene group having the carbon atoms of 1 to 20, or the polymethylene group having the carbon atoms to 3 to 20, and p is an integer of 1 to 3).

In said general formula (5), $R^8$ is a hydrogen atom, or the alkyl group having carbon atoms of 1 to 5. Among these, considering the storage stability and the handling property of the obtained photochromic composition, the alkyl group having carbon atoms of 1 to 5 is preferable. Particularly, the methyl group or the ethyl group are preferable.

$R^9$ is the alkyl group having the carbon atoms of 1 to 5, and preferably it is methyl group or ethyl group.

$R^{10}$ and $R^{11}$ are the alkylene group having the carbon atoms of 1 to 20, or the polymethylene group having the carbon atoms of 3 to 20; and preferably it is the alkylene group having carbon atoms of 1 to 10 or the polymethylene group having carbon atoms of 3 to 10.

p is an integer of 1 to 3, and it is preferably 2 or 3 since the crosslinking density of the polyurethane resin layer (the adhesive layer) formed from polyurethane polymer (A) improves.

As for the examples of the compounds shown in said general formula (5), N-(aminoalkyl)aminoalkyldialkoxysilane such as N-β(aminoethyl)-γ-aminopropyltrimethoxysilane, N-β(aminoethyl)-γ-aminopropylethoxysilane or so; N-(aminoalkyl)aminoalkylalkyldialkoxysilane such as N-β(aminoethyl)-γ-aminopropylmethyldimethoxysilane, N-β(aminoethyl)-γ-aminopropylmethylmethyldimethoxysilane or so may be mentioned.

[Chemical formula 6]

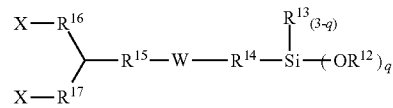

(6)

(In the formula, $R^{12}$ is a hydrogen atom, or the alkyl group having a carbon atoms of 1 to 5, $R^{13}$ is the alkyl group having the carbon atoms of 1 to 5, $R^{14}$, $R^{15}$, $R^{16}$, and $R^{17}$ are the alkylene group having the carbon atoms of 1 to 20, or the polymethylene group having the carbon atoms of 3 to 20, q is an integer of 1 to 3, W is —O(C=O)NH—, or —NH(C=O)NH—, and X is a group capable of reacting with isocyanate group).

In said general formula (6), $R^{12}$ is a hydrogen atom, or the alkyl group having carbon atoms of 1 to 5. Among these, considering the storage stability and the handling property of the obtained photochromic composition, the alkyl group having carbon atoms of 1 to 5 is preferable. Particularly, the methyl group or the ethyl group are preferable.

$R^{13}$ is the alkyl group having the carbon atoms of 1 to 5, and it is preferably the methyl group or the ethyl group.

$R^{14}$, $R^{15}$, $R^{16}$, and $R^{17}$ are the alkylene group having the carbon atoms of 1 to 20, or the polymethylene group having the carbon atoms of 3 to 20; and preferably it is the alkylene group having carbon atoms of 1 to 10 or the polymethylene group having carbon atoms of 3 to 10.

q is an integer of 1 to 3, and it is preferably 2 or 3 since the crosslinking density of the polyurethane resin layer (the adhesive layer) formed from polyurethane polymer (A) improves.

W is —O(C=O)NH—, or —NH(C=O)NH—, and it is formed by the reaction between the isocyanate group and the hydroxyl group or the amino group.

X is the group capable of reacting with the isocyanate group and it is the amino group, the hydroxyl group, the carboxyl group or the thiol group. Among these, the amino group, or the hydroxyl group are preferable from the point of the reactivity between the isocyanate group and the easiness to prepare.

As the compound shown in said general formula (6), it can be obtained from the reaction of the compound having the group and three isocyanate group within the molecule (the trivalent alcohol or trivalent amine), and the compound having the isocyanate group and the group capable of forming the silanol group by hydrolysis (the alkoxysilane compound having the isocyanate group). The preparation method according to the present invention is not particularly limited; however in any preparation, 1 mol of the compound having the isocyanate group and the silanol group or the group capable of forming the silanol group by hydrolysis is reacted against 1 mol of the compound having the group capable of reacting with three isocyanate group within the molecule.

As for the compound having the group capable of reacting three isocyanate groups within the molecule, trivalent alcohol such as glycerin, trimethylolpropane, 1,2,6-hexanetriol or so; triamine such as 2,2',2"-triaminotriethylamine, 4-aminomethyloctane-1,8-diamine or so may be mentioned. As the compound having the isocyanate group and the group capable of forming the silanol group by hydrolysis within the molecule; 3-isocyanatepropyltriethoxysilane or so may be mentioned.

(The Polymerizable Group Imparting Compound Introducing (Meth)Acrylate Group to the Side Chain)

As for such compound, the compound shown in the following general formula (7) may be mentioned.

[Chemical formula 7]

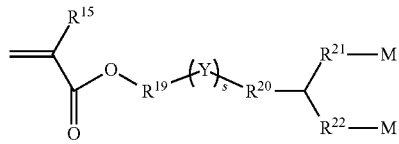

(7)

(In the formula, $R^{18}$ is a hydrogen atom or the methyl group, $R^{19}$, $R^{20}$, $R^{21}$, and $R^{22}$ are respectively an alkylene group of the carbon atoms of 1 to 20, or the polymethylene group having the carbon atoms of 3 to 20, s is an integer of 0 or 1, Y is —O(C=O)NH—, or —NH(C=O)NH—, and M is the group capable of reacting with isocyanate).

In the above general formula (7), $R^{18}$ is a hydrogen atom or a methyl group.

Also, $R^{19}$, $R^{20}$, $R^{21}$, and $R^{22}$ are respectively, an alkylene group having the carbon atoms of 1 to 20, or the polymethylene group having the carbon atoms of 3 to 20; and preferably it is the alkylene group having the carbon atoms of 1 to 10 or the polymethylene group having the carbon atoms of 3 to 10.

s is an integer of 0 or 1, and in case s is 0, $R^{19}$ and $R^{20}$ are directly bonded.

Y is —O(C=O)NH—, and it can be formed by the reaction between the isocyanate group and the hydroxyl group.

M is the group capable of reacting with the isocyanate group, and the amino group, the hydroxyl group, the carboxyl group, or the thiol group or so may be mentioned; however from the point of the stability of the compound, the hydroxyl group is preferable.

As the compound shown in said general formula (7), the reaction product of the compound comprising the trivalent alcohol and (meth)acrylic acid, or the isocyanate group and (meth)acrylate group within the molecule may be mentioned. The preparation method according to the present invention is not particularly limited, however in any preparation, 1 mol of the compound comprising (meth)acrylic acid, or the isocyanate group and (meth)acrylate group within the molecule react against 1 mol of trivalent alcohol.

As the example of the trivalent alcohol being used, glycerin, trimethylolpropane, 1,2,6-hexanetriol or so may be mentioned. As the compound having isocyanate group and (meth)acrylate group within the molecule, 2-methacryloyloxyethylisocyanate or so may be mentioned.

(The Polymerizable Group Imparting Compound Introducing the Epoxy Group at the Side Chain)

As for such compound, the compound shown in the following general formula (8) may be mentioned.

[Chemical formula 8]

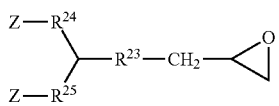

(8)

(In the formula, $R^{23}$, $R^{24}$, $R^{25}$ are respectively the alkylene group having the carbon atoms of 1 to 20, or the polymethylene group having the carbon atoms of 3 to 20, Z is the group which reacts with the isocyanate group).

In said general formula (8), $R^{23}$, $R^{24}$, and $R^{25}$ are respectively the alkylene group having the carbon atoms of 1 to 20, or the polymethylene group having the carbon atoms of 3 to 20; and preferably it is the alkylene group having the carbon atoms of 1 to 10, or the polymethylene group having the carbon atoms of 3 to 10.

Z is the group capable of reacting with the isocyanate group, and it is the amino group, the hydroxyl group, the carboxyl group, or the thiol group; however it is preferably the hydroxyl group from the point of easiness to obtain.

As the compound shown in said general formula (8), it can be prepared by the reaction between the trivalent alcohol and epichorohydrin. The preparation method according to the present invention is not particularly limited, and in any preparation, 1 mol of epichlorohydrin is bound to 1 mol of trivalent alcohol. In the reaction between the trivalent alcohol and epichorohydrin, the corresponding by-product will be generated; however it can be separated by conventional separation method. As for the example of the trivalent alcohol used for the preparation of the compound capable of introducing the epoxy group to urethane polymer side chain, glycerin, trimethylolpropane, 1,2,6-hexanetriol or so may be mentioned.

By producing the urethane polymer (A) by using the above mentioned component A4, said urethane polymer has the polymerizable group. This component A4 can be introduced into either of the molecular end terminal or the side chain of the obtained urethane polymer in order to improve the heat resistance, the solvent resistance and the adhesiveness of the adhesive layer formed from the urethane polymer (A).

The urethane polymer (A) used in the present invention can be prepared from said components A1, A2, A3, and A4; however the component A5 (the reaction terminator having one group capable of reacting with the isocyanate group within the molecule) shown in below can be used as well. Next, this component A5 (the reaction terminator) will be described.

(The Component A5: The Reaction Terminator Having the Group Capable of Reacting with One Isocyanate Group within the Molecule (the Reaction Terminator))

When preparing the urethane polymer (A) used in the present invention, the reaction terminator (hereinafter, it may be simply referred as "the component A5") having the group capable of reacting with one isocyanate group within one molecule can be used together.

The component A5 is the reaction terminator having the group capable of reacting with one molecule, and by using said component A5, the end terminal of the urethane polymer (A) can be converted with the non-polymerizable group other than the isocyanate group. Note that, the urethane polymer (A) must have said polymerizable group in the molecule.

As for the group capable of reacting with said isocyanate group, the amino group (—NH$_2$ group, and —NH(R) group), the hydroxyl group (—OH group), the mercapto group (—SH group: thiol group), the carboxyl group [—C(=O)OH group] or acid chloride group [—C(=O)OCl group] or so may be mentioned.

This reaction terminator has only one group capable of reacting with the isocyanate group in the molecule. If two or more said groups are present, the obtained component A by the reaction with the component A4 becomes high molecule weight material which causes high viscosity during the organic solvent dilution; hence in some case, it was difficult of coating the membrane. Also, it tends to decline the adhesiveness of the obtained photochromic adhesive agent (the adhesiveness between the optical sheets). By introducing said reaction terminator to the end of the urethane resin, the number average molecular weight of the urethane resin can be controlled, and it can be easily controlled to have the aiming physical properties such as the adhesiveness, the heat resistance and the photochromic characteristic or so.

Also, said reaction terminator preferably uses the compound having a piperidine structure, a hindered phenol structure, a triazine structure, or a benzotriazol structure. This is because said piperidine structure, the hindered phenol structure, the triazine structure, or the benzotriazol structure becomes a part which exhibits a photostabilizing effect (the piperazine structure), an anti-oxidation effect (the hindered phenol structure), or a ultraviolet ray absorbing effect (the triazine structure, or the benzotriazol structure). By using the reaction terminator having such structure, the durability (the photostability, the anti-oxidant property, the ultraviolet ray absorbing property) of the urethane polymer itself as the component A and the photochromic compound can be improved. Also, since the amount of the additives such as hindered amine or the antioxidants can be reduced, the decline of the adhesiveness caused by the additives can be improved. Among these, in order to improve the durability of the photochromic compound, the compound having the piperidine structure is preferably used.

As the reaction terminator suitably used as the component A5, for example, as the compound having the piperidine structure, the following compound may be mentioned. Specifically, the reaction terminator having the group capable of reacting with one isocyanate group and having the piperidine structure in the molecule such as 1,2,2,6,6-pentamethyl-4-hydroxypiperidine, 1,2,2,6,6-pentamethyl-4-aminopiperidine, 2,2,6,6,-tetramethyl-4-aminopiperidine or so may be mentioned. Also, other than this, the reaction terminator having the group capable of reacting with one isocyanate group and having the hindered phenol structure, the triazine structure, or the benzotriazol structure in the molecule can be used as well.

Also, as for the component A5, the reaction terminator such as methylamine, ethylamine, propylamine, isopropylamine, butylamine, tert-butylamine or so may be mentioned. These amine based compounds can be the reaction terminator since only 1 mol thereof usually react against 1 mol of the isocyanate group at room temperature.

Said component A5 is preferably introduced at the molecular end terminal of the urethane polymer (A) in order to improve the weather resistance of the obtained photochromic composition. By introducing at the molecular end terminal, the heat resistance and the mechanical strength (the adhesive strength) of the urethane resin is not compromised.

The reaction terminator above described may be used alone or by combining two or more thereof; however it is preferable to use the reaction terminator having the piperidine structure from the point of improving the durability of the urethane polymer (A), and the photochromic compound.

(The Preparation Method of the Component A)

In case of obtaining the component A by reacting these component A1, component A2, component A3, and component A4 and the component A5 depending on the needs, so called one shot method or a prepolymer method can be employed, and for example, the component A can be suitably obtained by the below method.

(The Preparation Method 1: (the Component A Having the Polymerizable Group at the End Terminal))

The urethane polymer is obtained by reacting the component A1 and the component A2, then said urethane polymer is reacted with the component A3. The end terminal isocyanate group remaining in the obtained polymer, the component A4 having the group capable of reacting with one isocyanate group in the molecule, and the reaction terminator (A5) having the group capable of reacting with one isocyanate group in the molecule are reacted; thereby the component A can be produced.

In said method, the reaction between the component A1 and the component A2, may be carried out under the presence of the solvent or without the solvent in the inert gas atmospheres such as argon or so at 25 to 120° C. for 0.5 to 24 hours. As for the solvent, the organic solvent such as methylethylketone, diethylketone, toluene, hexane, heptane, ethyl acetate, dimethylformamide (DMF), dimethylsulfoxide (DMSO), tetrahydrofurane or so may be used. During the reaction, in order to avoid the reaction between the isocyanate group in the polyisocyanate compound as the component A2 and water as impurities, it is preferable that various reaction reagents and solvent are carried out with dehydration treatment in advance to dry sufficiently. Also, when carrying out the above mentioned reaction, the catalyst such as dibutyl tin laurylate, dimethylimidazole, triethylenediamine, tetramethyl-1,6-hexadiamine, tetramethyl-1,2-ethanediamine, 1,4-diazabicyclo[2,2,2]octane or so may be used. The added amount when using the catalyst is preferably 0.001 to 1 parts by mass with respect to total 100 parts by mass of said A component.

The reaction between the component A3 and the urethane prepolymer obtained as such may be carried out under the presence of solvent or without the solvent, both in the inert gas atmosphere such as nitrogen or argon or so at 25 to 120° C. for 0.5 to 24 hours. As for the solvent, methylethylketone, diethylketone, toluene, hexane, heptane, ethyl acetate, DMF, DMSO, THF or so can be used.

The reaction between the component A4 and the obtained polymer as such may be carried out under the presence of solvent or without the solvent, both in the inert gas atmosphere such as nitrogen or argon or so at 25 to 120° C. for 0.5 to 24 hours. As for the solvent, methylethylketone, diethylketone, toluene, hexane, heptane, ethyl acetate, DMF, DMSO, THF or so can be used.

In case the urethane polymer (A) having the isocyanate group at the end terminal of the molecular chain is prepared by the above mentioned reaction, it may be used as it is. Note that, in order to improve the storage stability and the weather resistance of the photochromic composition, the component A5 and the isocyanate group are preferably reacted. The reaction between the component A5 and said urethane polymer (A) may be carried out under the presence of solvent or without the solvent, both in the inert gas atmosphere such as nitrogen or argon or so at 25 to 120° C. for 0.5 to 24 hours. As for the solvent, methylethylketone, diethylketone, toluene, hexane, heptane, ethyl acetate, DMF, DMSO, THF or so can be used.

(The Preparation Method 2: The Component A Having the Polymerizable Group at the Side Chain)

The urethane prepolymer is obtained by reacting the component A1 and the component A2, then urethane prepolymer having the polymerizable group at the side chain is obtained by mixing and reacting the component A4 having the group capable of reacting with two isocyanate group in the molecule; next the urethane prepolymer and the component A3 is reacted to produce the component A.

In said method, the reaction between the component A1 and the component A2 can be carried out as the same method described in the aforementioned preparation method 1.

Next, to said reaction solution, the component A4 capable of introducing the polymerizable group to the side chain is added, and by carrying out the reaction as same as the reaction between the component A1 and the component A2 of the preparation method 1, the prepolymer is obtained.

The reaction between the urethane prepolymer obtained as such and the component A3, then the reaction between the component A4, and further the reaction between the component A5, which is carried out accordingly, can be carried out as same as the above mentioned preparation method 1.

(The Blending Ratio of Each Component and the Characteristic of the Component A)

The amount ratio of the component A1, the component A2, the component A3, the component A4, and the component A5 used depending on the need used for the reaction of the above mentioned method may be determined accordingly; however it is preferably the amount ratio as described in the following, from the point of the balance between the heat resistance, the adhesive strength, the photochromic characteristic (the color optical density, the color fading speed and the weather resistance or so) of the obtained photochromic composition and the photochromic adhesive sheet obtained from said composition.

When the total mol number of the hydroxyl group included in the component A1 is n1,
the total mol number of the isocyanate group included in said component A2 is n2,
the total mol number of the group capable of reacting with the isocyanate group included in said component A3 is n3,
the total mol number of the group capable of reacting with the isocyanate group included in said A4 component is n4, and
the total mol number of the group capable of reacting with the isocyanate group included in said A5 component is n5, then
the amount ratio of the component A1, the component A2, the component A3 is preferably;
n1:n2:n3:n4:n5=0.33 to 0.85:1.0:0.1 to 0.65:0.01 to 0.3:0 to 0.2.

In order for the obtained photochromic composition (the photochromic adhesive agent) to exhibit excellent adhesiveness, the heat resistance and the photochromic characteristic, it is preferably,
n1:n2:n3:n4:n5=0.4 to 0.85:1.0:0.1 to 0.55:0.02 to 0.25: 0.01 to 0.15; more preferably n1:n2:n3:n4:n5=0.45 to 0.8: 1.0:0.15 to 0.5:0.04 to 0.2:0.01 to 0.1. Here, said n1, n2, n3, n4, and n5 can be obtained as the product of the number of each group present in one molecule of the compound and the used mol number of the compound as each component. Note that, in the above formula, 0.9≤n1+n3+n4≤1.1 is preferable, and n1+n3+n4=1 is further preferable.

That is, in case the component A5 is not used, considering the storage stability, it is preferably n2=n1+n3+n4. Also, in case the component A5 is used, considering the storage stability, it is preferably n2=n1+n3+n4+n5.

The urethane polymer (A) obtained by such reaction is carried out with the after treatment such as distillation of the solvent if needed, or dropping the poor solvent such as water or so thereby precipitate/filter the urethane polymer then carrying out the drying or so, then it may be used as the component A; or it can be used by keeping it dissolved in the reaction solvent.

The component A preferably has a molecular weight of 2000 to 100000, more preferably 3000 to 50000, and particularly preferably 4000 to 30000, from the point of the heat resistance, the adhesive strength, the photochromic characteristics (the color optical density, the color fading speed, the weather resistance or so). Note that, the molecular weight of the above mentioned urethane polymer refers to the molecular weight of peak top measured under the condition of using a gel permeation chromatography (GPC) in terms of polyethylene oxide, column: Shod ex KD-805, KD-804 (made by SHOWA DENKO K.K.), eluent: LiBr (10 mmol/L)/DMF solution, flow speed: 1 ml/min, detector:R1 detector, urethane polymer sample solution: 0.5% dimethylformamide (DMF) solution.

For the photochromic composition of the present invention, which will be described in below, the mol number of the polymerizable group per 100 gram (g) of the entire component having the polymerizable group included in the photochromic composition including the polymerizable group included in this component A must be;

(1) 10 mmol or more and 250 mmol or less in case the polymerizable group is the silanol group or the group capable of forming the silanol group by hydrolysis, (2) 10 mmol or more and 200 mmol or less, in case the polymerizable group is (meth)acrylate group, epoxy group, and vinyl group.

(The Component B: The Photochromic Compound)

As for the photochromic composition used as the component B in the photochromic composition of the present invention, the known photochromic compounds such as chromene compounds, fulgimide compounds, spirooxazine compounds, spiropyran compounds or so can be used without any limitation. These may be used alone or by combining two or more thereof.

As the above mentioned, fulgimide compounds, spiroxazine compounds, spiropyran compounds, and chromene compounds, for examples the compounds described in JP Patent Application Laid Open No. H02-28154, JP Patent Application Laid Open No. S62-288830, WO94/22850 pamphlet, WO96/14596 or so may be mentioned.

Particularly, as for chromene compounds other than those described in the above listed patent articles, the chromene compound having excellent photochromic characteristics is known and such chromene compounds can be suitably used as the component B. As such chromene compounds, JP Patent Application Laid Open No. 2001-031670, JP Patent Application Laid Open No. 2001-011067, JP Patent Application Laid Open No. 2001-011066, JP Patent Application Laid Open No. 2000-344761, JP Patent Application Laid Open No. 2000-327675, JP Patent Application Laid Open No. 2000-256347, JP Patent Application Laid Open No. 2000-229976, JP Patent Application Laid Open No. 2000-229975, JP Patent Application Laid Open No. 2000-229974, JP Patent Application Laid Open No. 2000-229973, JP Patent Application Laid Open No. 2000-229972, JP Patent Application Laid Open No. 2000-219678, JP Patent Application Laid Open No. 2000-219686, JP Patent Application Laid Open No.H11-322739, JP Patent Application Laid Open No.H11-286484, JP Patent Application Laid Open No.H11-279171, JP Patent Application Laid Open No.H09-218301, JP Patent Application Laid Open No.H09-124645, JP Patent Application Laid Open No.H08-295690, JP Patent Application Laid Open No. 08-176139, JP Patent Application Laid Open No.H08-157467, U.S. Pat. No. 5,645,767, U.S. Pat. No. 5,658,501, U.S. Pat. No. 5,961,892, U.S. Pat. No. 6,296,785, JP Patent No. 4424981, JP Patent No. 4424962, WO2009/136668 pamphlet, WO2008/023828 pamphlet, JP Patent No. 4369754, JP Patent No. 4301621, JP Patent No. 4256985,WO2007/086532 pamphlet, JP Patent Application Laid Open No. 2009-120536, JP Patent Application Laid Open No. 2009-67754, JP Patent Application Laid Open No. 2009-67680, JP Patent Application Laid Open No. 2009-57300, JP Patent No. 4195615, JP Patent No. 4158881, JP Patent No. 4157245, JP Patent No. 4157239, JP Patent No. 4157227, JP Patent No. 4118458, JP Patent Application Laid Open No. 2008-74832, JP Patent No. 3982770, JP Patent No. 3801386, WO2005/028465 pamphlet, WO2003/042203 pamphlet, JP Patent Application Laid Open No. 2005-289812, JP Patent Application Laid Open No. 2005-289807, JP Patent Application Laid Open No. 2005-112772, JP Patent No. 3522189, WO2002/090342 pamphlet, JP Patent No. 3471073, JP Patent Application Laid Open No. 2003-277381, WO2001/060811 pamphlet, WO00/71544 pamphlet or so are disclosed.

Among these other photochromic compounds, from the point of the photochromic characteristics such as the color optical density, the initial coloring, the durability, the color fading speed or so, it is preferable to use one or more of the chromene compounds having indenonaphto(2,1-f)naphto-(2,1-b) pyran structure. Further, among these chromene compounds, the compounds having the molecular weight of 540 or more is suitable as it exhibits particularly excellent color optical density and color fading speed.

[Chemical formula 9]

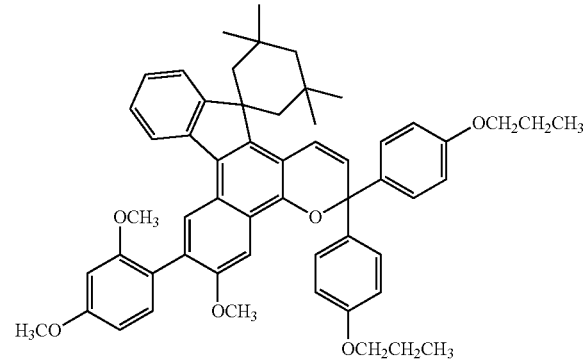

[Chemical formula 10]

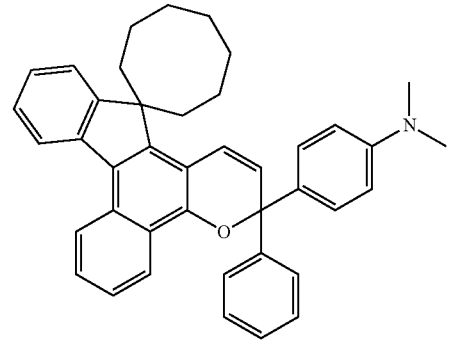

[Chemical formula 11]

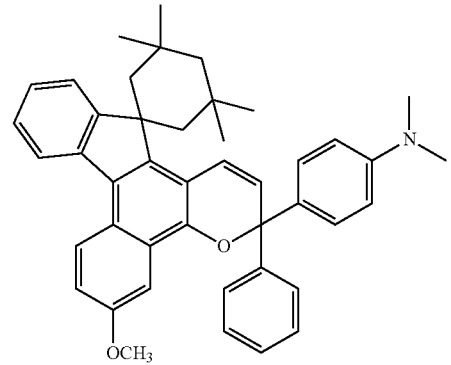

[Chemical formula 12]

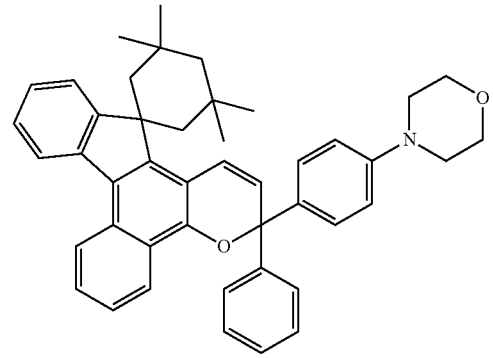

[Chemical formula 13]

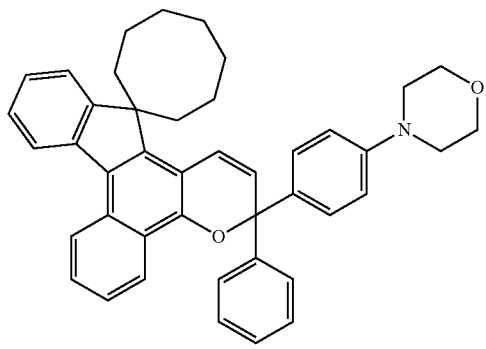

[Chemical formula 14]

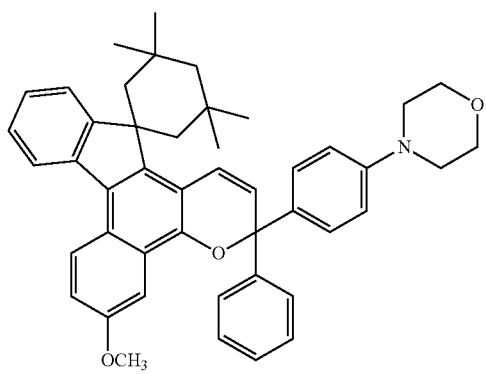

[Chemical formula 15]

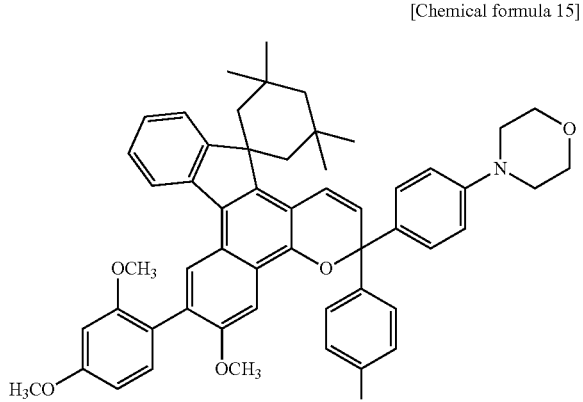

[Chemical formula 16]

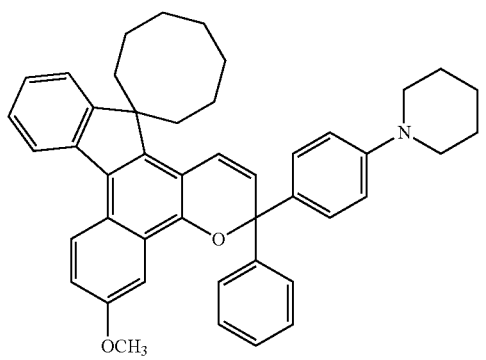

[Chemical formula 17]

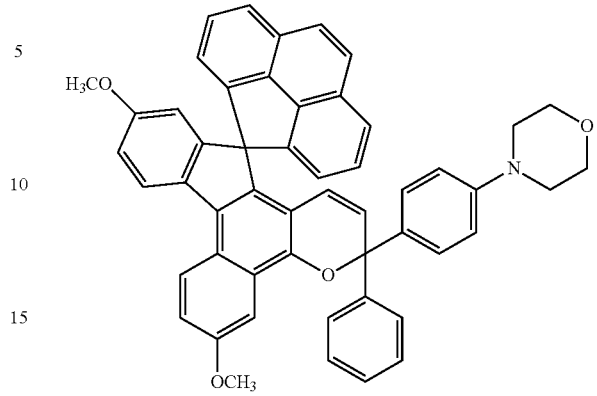

(The Blending Amount of the Component B)

The blending amount of the component B in the photochromic composition of the present invention is suitably 0.1 to 20 parts by mass with respect to 100 parts by mass of the component A from the point of the photochromic characteristic. In case the above mentioned blending amount is too little, sufficient color optical density or durability tends to be difficult to obtain, and when it is too much, although it depends on the type of the photochromic compound, the photochromic compositions becomes difficult to dissolve against the component A which not only causes the uniformity of the composition to decline, but also the bonding force (the adhesive force) tends to decline. In order to maintain the photochromic characteristics such as the color optical density or the durability or so while sufficiently maintaining the adhesion between the optical base material such as plastic film or so, the added amount of the component B is preferably 0.5 to 10 parts by mass and more preferably 1 to 5 parts by mass with respect to 100 parts by mass of the component A.

(The Optional Component)

The photochromic composition of the present invention may include, besides the component A and the component B, (C) the isocyanate compound (hereinbelow it may be simply referred as the component (C)), and (D) the organic solvent (hereinbelow it may be simply referred as the component D), and other components. Hereinafter, these optional components will be explained.

(The Component C: The Isocyanate Compound Having at Least One Isocyanate Group within the Molecule)

The photochromic composition of the present invention exhibits excellent adhesiveness and the photochromic characteristic by blending the component C. As the component C, the known isocyanate compound can be used without any particular limitations. These may be used alone or by combining two or more thereof.

It is not clear why excellent adhesiveness is exhibited by blending the component C, however the following reason is thought. A part of the isocyanate group included in the component C is hydrolyzed by the water included in the photochromic composition of the present invention, or by the moisture in the surrounding environment (that is, under the presence of water); thereby the amino group is produced. This amino group formed reacts with the isocyanate group left in the component C; thereby produces the reaction product having urea bond. The urea bond of the reaction product generated here forms the hydrogen bond between the urethane bond and urea bond present in the component A; thereby it is thought that the aggregation force of the photochromic adhesive layer is improved, and the adhesiveness and the heat resistance are also improved. Particularly, after being contacted with the hot water, the adhesiveness (the adhesiveness between the optical sheet and said adhesive layer) can be highly maintained.

As for the above mentioned isocyanate compound, in addition to the isocyanate compound shown as examples of the component A2, the compound having at least one isocyanate group in the molecule, such as 1-adamantyl isocyanate, propyl isocyanate, isopropyl isocyanate, butyl isocyanate, tert-butyl isocyanate, hexane isocyanate, nonyl isocyanate, dodecyl isocyanate, cyclohexyl isocyanate, 4-methylcyclohexyl isocyanate or so may be mentioned.

Also, the compound having three isocyanate group in the molecule such as, 1,3,5-tris(6-isocyanatohexyl)biuret, (2,4, 6-trioxytriazine-1,3,5(2H,4H,6H)tolyl)tris(hexamethylene) isocyanate or so may be mentioned.

Also, the isocyanate compound (C') (hereinafter, it may simply referred as the component C') obtained by reacting aforementioned component A3 with the isocyanate compound having two or more isocyanate groups in the molecule can also be used as the component C of the present invention.

When preparing the above mentioned the component C', it is preferably those obtained by reacting the diisocyanate compound which is the aforementioned the component A3 with the aminoalcohol compound which is the aforementioned component A3 or diol compound.

The component C' have one or more isocyanate group within the molecule. Therefore, when preparing the component C', the total mol number of the isocyanate group of the component A2 must be larger than the total mol number of the group capable of reacting with the isocyanate group of the component A3.

The isocyanate group included in said component C can be used in the condition being protected by the blocking agent. As for the blocking agent, for example, acid amides, lactams, acid imides, imidazols, ureas, oxime based compounds or so may be used. Specifically, acetanilide, acetic acid amide, ε-caprolactam, succinic imides, maleic imides, dimethylpyrazole, thiourea, acetoald oxime, acetone oxime, methylethylketone oxime or so may be mentioned.

The number of the isocyanate group included in the component C (the component C') may be one, however it is preferably two or more. By having two or more isocyanate groups in the molecule of the component C, when forming the photochromic adhesive agent layer, the urea resin (the reaction product of the component C) having large molecular weight can be formed. As a result, the aggregation force between the reaction product of the component C and the component A is greatly improved thus a great effect of the improved adhesiveness is exhibited. On the other hand, in case four or more isocyanate groups are present (in the molecule of the component C), the urea resin crosslinked in a mesh form is formed, thus the phase separation tends to easily occur between the component A which tends to cause the opaque photochromic adhesive layer of the present invention.

Therefore, the component C (including the component C') is a compound preferably having two or three isocyanate groups in the molecule, and more preferably it is a compound having two isocyanate groups.

Also, the component C is preferably the isocyanate compound selected from the aliphatic isocyanate compounds and alicyclic isocyanate compound from the point of the weather resistance. The aromatic isocyanate compound easily causes the phase separation between the component A, and tends to cause the opaque photochromic adhesive layer of the present invention. This is thought to be caused since the aromatic isocyanate compound has faster reaction and higher aggregation force than the aliphatic isocyanate compound and the alicyclic isocyanate compound. From the point of this opaqueness, the component C is preferably the isocyanate compound selected from the aliphatic isocyanate compound and the alicyclic isocyanate compound.

In the present invention, the molecular weight of said the component C (including said the component C') is not particularly limited, however it is preferably less than 1000. In case the molecular weight of said the component C is 1000 or larger, the heat resistance and film strength of the obtained photochromic adhesive layer tends to decline. It is thought that when the isocyanate compound having high molecular weight is blended, it affects the structural part other than the urea bond in the reaction product of the component C. Also, if the mol number of the isocyanate group is present more than a specific amount in order to improve the adhesion, the blending amount against the component A increases for the isocyanate compound having large molecular weight. As a result, the structural part other than the urea bond of said reaction product is thought to be influenced easily. From this point of view, the molecular weight of the component C is preferably less than 1000. As described in above, the molecular weight of the component C is further preferably 750 or less, and most preferably 600 or less. Obviously, the molecular weight of said the component C' is less than 1000 from the same reason. This the component C (the component C') is preferably not a polymer as mentioned in above. Therefore, the molecular weight of said the component C (component C') refers to the molecular weight of the component C (component C') itself. The lower limit of the molecular weight of the component C is the molecular weight of the monomeric compound, and it is 100 though it is not particularly limited.

(The Blending Amount of the Component C)

The blending amount of the component C in the photochromic composition in the present invention is suitably 0.1 to 20 parts by mass with respect to 100 parts by mass of the component A from the point of the adhesiveness, the heat resistance and the photochromic characteristics. In case the above blending amount is too little, the effect of improved adhesiveness and the heat resistance can not be obtained sufficiently, and in case it is too much, the adhesive layer obtained from said photochromic composition tends to change opaque, lower the adhesiveness, and lowers the durability of the photochromic compound. In order to improve the adhesion between the optical base material such as plastic film or so while maintaining the photochromic characteristics such as the color optical density or the durability, the blending amount of the component C is 0.1 to 10 parts by mass, more preferably 0.5 to 5 parts by mass with respect to 100 parts by mass of the component A. Here, the ratio of the isocyanate group of the component C is 0.01 to 10 parts by mass, preferably 0.02 to 5.0 parts by mass, and further preferably 0.1 to 3.0 parts by mass with respect to 100 parts by mass of the component A.

Also, in case of using the component C, the water can be blended to the photochromic composition. The amount of water only needs to be an effective amount to hydrolyze the component C, and usually it is 0.01 mol times more to 5 mol times with respect to the mol number of the isocyanate group included in the component C. Also, this water can be substituted with the moisture (humidity) included in the atmosphere when bonding the optical sheet or the optical film against each other by the photochromic adhesive sheet.

(The Component D: The Organic Solvent)

By blending the organic solvent to the photochromic composition of the present invention, the urethane polymer having the polymerizable group (the component A), the photochromic compound (the component B), further the isocyanate compound (the component C) which is added depending on the needs, and other components becomes easy to mix. As a result, the uniformity of the photochromic composition can be improved. Further, by using the organic solvent, the viscosity of the photochromic composition can be controlled suitably. Further, the handling property when coating the photochromic composition of the present invention to the optical sheet or film, and the membrane thickness can be enhanced.

In case the material easily affected by the organic solvent is used as the optical sheet or film, the appearance may be damaged, or the photochromic characteristic may decline; however such problems can be avoided by applying the following described method of the present invention. Also, regarding the photochromic composition of the present invention, as it will be described in the following, various types of solvent can be used, thus the above mentioned problems can be prevented by using the solvent selected from those which barely affects the optical sheet or film as the solvent.

For examples of the organic solvent which can be suitably used as the component D, alcohols such as methanol, ethanol, n-propanol, i-propanol, n-butanol, t-butanol, 2-butanol or so; polyvalent alcohol derivatives such as ethyleneglycolmonomethylether, ethyleneglycolmonoisopropylether, ethyleneglycolmonoethylether, ethyleneglycolmono-n-propylether, etheyleneglycolmono-n-butylether, ethylenglycolmono-t-butylether, propyleneglycolmonomethylether, propyleneglycolmonoethylether, propyleneglycol-n-butylether, or so; diacetone alcohol; methylethyl ketone; diethylketone; toluene; hexane; heptane; ethyl acetate; dimethylformamide (DMF); dimethylsulfoxide (DMSO); tetrahydrofuran (THF); cyclohexane or so; and the combinations thereof may be mentioned. Among these, it may be selected accordingly depending on the type of the component A used or the material of the optical sheet or film. For example, in case of using the polycarbonate resin as the optical sheet or film and coating the photochromic composition of the present invention directly, alcohols, or polyvalent alcohol derivatives is preferably used as for the solvent.

Also considering the smoothness of the coating layer when coating the photochromic composition of the present invention to the optical sheet or the film, or the smoothness of the photochromic adhesive layer (sheet) employing the method of the present invention described in below, the organic solvent having the boiling point of less than 90° C. and the organic solvent having the boiling point of 90° C. or higher are preferably mixed for use. By using the organic solvent having such combination, the removal of the organic solvent becomes easy in addition to said smoothness, and the drying speed can be fasten. The blending ratio of the organic solvent having the boiling point of less than 90° C. and that of 90° C. or higher may be determined accordingly depending on other components used. Among these, in order to exhibit excellent effect, it is preferable that the organic solvent having the boiling point of less than 90° C. is 20 to 80 mass % and the organic solvent having the boiling point of 90° C. or higher is 80 to 20 mass % when whole organic solvent amount is 100 mass %.

Also, the blending amount in case of using the component D is, from the point of the effect obtained by adding the component D as mentioned in above, 5 to 900 parts by mass, more preferably 100 to 750 parts by mass and most preferably 200 to 600 parts by mass with respect to 100 parts by mass of the component A.

Also, the photochromic composition of the present invention is preferably blended with various polymerization initiator depending on the polymerization group included in the urethane polymer (A). Further, if the mol number of the polymerization group satisfies the mol number described in below, the monomer having other polymerizable group can be blended.

(The Polymerization Initiator)

The photochromic composition of the present invention may be added with various polymerization initiator in order to efficiently crosslink the polymerizable group included the monomer, in case the polymerizable group included in the urethane polymer (A) and the monomer having the polymerizable group are blended.

(The Polymerization Initiator of the Silanol Group or the Group Capable of Forming the Silanol Group by Hydrolysis)

In case the urethane polymer (A) has the group capable of forming the silanol group by hydrolysis, it is preferable to add an acid aqueous solution. As such acid, although it is not particularly limited, the inorganic acid such as hydrochloric acid, sulfuric acid, nitric acid, phosphoric acid or so; the organic acid such as acetate acid, propionate acid or so are representative examples, and from the point of the hydrolysis, the hydrochloric acid is suitable, further the hydrochloric acid solution of 0.0001 to 0.1 titration is preferably used. The added amount of the acid aqueous solution is preferably 0.1 to 3 mol times more of the necessary amount for the hydrolysis of the group capable of hydrolyzing all of the group capable of forming the silanol group by hydrolysis.

Further, in case the urethane polymer (A) has the silanol group or the group capable of forming the silanol group by hydrolysis, as for the polymerization initiator, a curing catalyst such as acetylacetonato complex, perchlorate, organic metal salt, various Louis acid or so may be preferably used.

As for such acetylacetonato, aluminum acetylacetonato, lithium acetylacetonato, indium acetylacetonato, chromium acetylacetonato, nickel acetylacetonato, titanium acetylacetonato, iron acetylacetonato, zinc acetylacetonato, cobalt acetylacetonato, copper acetylacetonato, zirconium acetylacetonato or so may be mentioned. Among these, aluminum acetylacetonato, titanium acetylacetonato are suitable.

As for perchlorate, magnesium perchlorate, aluminum perchlorate, zinc perchlorate, ammonium perchlorate or so may be mentioned examples.

As for the organic metal salt, sodium acetate, zinc naphthenate, cobalt naphthenate, zinc octate or so may be mentioned examples.

As for the Louis acid, stannic chloride, aluminum chloride, ferric chloride, titanium chloride, zinc chloride, antimony chloride or so may be mentioned as the examples.

In the present invention, from the point of crosslinking under relatively low temperature in a short period of time, acetylacetonato complex is particularly suitable.

The used amount of these curing catalyst is preferably within the range of 0.001 to 3 parts by mass with respect to 100 parts by mass of the component A. said curing catalyst may be used alone or by mixing plurality of these.

(The Polymerization Initiator of (Meth)Acrylate Group or the Vinyl Group)

In case the urethane polymer (A) has (meth)acrylate group or the vinyl group, as the polymerization initiator, thermal polymerization initiator, or the photopolymerization initiator are preferably used.

In case of curing said urethane polymer (A) by heat, as for the thermal polymerization initiator, diacyl peroxide such as benzoyl peroxide, p-chlorobenzoyloxide, decanoyl peroxide, lauryl peroxide, acetyl peroxide or so; peroxy ester such as t-butyl peroxy-2-ethylhexanoate, t-butyl peroxy carbonate, cumyl peroxy neodecanate, t-butyl peroxy benzoate or so; percarbonates such as diisopropyl peroxy dicarbonate, di-2-ethylhexyl peroxy dicarbonate, di-sec-butyloxy carbonate or so; azo compounds such as 2,2'-azobis(4-dimethyl valeronitrile), 2,2'-azobis(2-methylbutylonitrile) 1,1'-azobis (cyclohexane-1-carbonitrile) or so can be used.

The used amount of these thermal polymerization initiator differs depending on the polymerization condition, type of the initiator, the type and amount of the polymerization group; however it is preferably used in the range of 0.001 to 1 parts by mass with respect to 100 parts by mass of the component A. Said thermal polymerization initiator can be used alone or by combining plurality thereof.

Also, in case of carrying out the polymerization by the light irradiation such as ultraviolet ray or so, benzoin, benzoin methylether, benzoin butylether, benzophenol, acetophenon 4,4'-dichlorobenzophenon, diethoxyacetophenon, 2-hydroxy-2-methyl-1-phenyl propane-1-on, benzylmethylketal, 1-(4-isopropylphenyl)-2-hydroxy-2-methylpropane-1-on, 1-hydroxycyclohexylphenylketone, 2-isopropylthioxanthone, bis(2,6-dimethoxybenzoyl)-2,4,4-trimethyl-pentylphosphinoxide, bis(2,4,6-trimethylbenzoyl)-phenylphosphineoxide, 2,4,6-trimethylbenzoyldiphenyl-phosphineoxide, 2-benzyl-2-dimethylamino-1-(4-morphonilophenyl)-butanon or so may be used.

The used amount of these photopolymerization can be within the range of 0.001 to 0.5 parts by mass with respect to 100 parts by mass of the component A, although it may differ depending on the polymerization condition or the type of the initiator, the type and the content of the polymerizable group. Said radical polymerization initiator can be used alone or by mixing plurality thereof.

In case the photopolymerization as mentioned in the above is used, the polymerization can be facilitated by irradiating a light when bonding the optical sheet or the optical film by the photochromic adhesive sheet (layer). Specifically, by using a metal halide lamp, an extra high pressure mercury lamp, a high pressure mercury lamp, a medium pressure mercury lamp, a xenon lamp or an electrodeless lamp or so as the light source, the light irradiation can be carried out to the two optical sheet or the optical films bonded by the photochromic adhesive sheet (layer) including the photopolymerization initiator. The atmosphere of the light irradiation may be under the presence of the oxygen, however it may be substituted with the inert gas such as nitrogen or so. Further, after the light irradiation, a heat applying treatment may be carried out.

(The Polymerization Initiator of the Epoxy Group)

In case the urethane polymer (A) comprises the epoxy resin, the curing agent used for the polymerization of the conventional epoxy compound can be used without any limitation as the polymerization initiator.

As for the curing agent of the epoxy resin, a phenol resin based curing agent, a polyamine based curing agent, a polycarboxylic acid based curing agent, imidazol based curing agent or so may be mentioned.

Specifically, as for the phenol resin based curing agent, phenol novolac resin, cresol novolac resin, polyp-vinylphenol or so may be mentioned; as polyamine based curing agent, diethylenetriamine, triethylenetetramine, tetraethyl-enepentamine, dicyandiamide, polyamideamine (polyamide resin), melamin resin, ketimine compound, isophorone diamine, m-xylenediamine, m-phenylenediamine, 1,3-bis (aminomethyl)cyclohexane, N-aminoethylpiperazine, 4,4-diaminodiphenylmethane, 4,4'-diamino-3,3'-diethylphenyl-methane, diaminodiphenylsulfone, dicyandiamide or so may be mentioned; as polycarboxylic acid based curing agent, phthalic anhydride, tetrahydro phthalic anhydride, methyl-tetrahydro phthalic anhydride, 3,6-end methylenetetrahydro phthalic anhydride, hexachloro end methylene tetrahydro phthalic anhydride, methyl-3,6-end methylene tetrahydro phthalic anhydride or so may be mentioned; or as the imidazol based curing agent, 2-methyl imidazol, 2-ethyl-hexyl imidazol, 2-undecyl imidazol, 2-phenyl imidazol, 1-cyanoethyl-2-phenyl imidazorium.torimerritate, 2-phenylimidazorium.isocyanurate or so may be mentioned.

As the used amount of these curing agent, 0.001 to 1.0 parts by mass with respect to 100 parts by mass of the component A is suitable. Said curing agent may be used alone or by combining plurality thereof.

In case the curing catalyst, the thermal polymerization initiator, and the curing agent are used as the polymerization initiator as shown in above, the polymerization can be facilitated by heating using the oven or so when bonding the optical sheet or the optical film by the photochromic adhesive sheet (layer). Specifically, it is preferable to heat at 90° C. or higher for 30 minutes or longer, and more preferably at 100° C. or higher and for 1 hour or longer.

(The Monomer Having the Polymerizable Group)

In the photochromic composition of the present invention, the monomer having the polymerizable group can be added additionally besides the urethane polymer (the component A) having the polymerizable group.

The polymerizable group of the monomer having the polymerizable group is selected from the group consisting of aforementioned silanol group or the group capable of forming the silanol group by hydrolysis, the (meth)acrylate group, the epoxy group, and the vinyl group. As for the monomer having the polymerizable group, it may be the monomer having the polymerizable group of the above mentioned; however known alkoxy silane compound, (meth)acrylate monomer, epoxy based monomer, and vinyl monomer or so can be used without any limitation.

In case of using the urethane polymer having the silanol group or the group capable of forming the silanol group by hydrolysis in the component A, the alkoxysilane compound is preferably used as the monomer having the polymerizable group. As for the example of alkoxysilane compound, γ-glycidoxypropyltrimethoxysilane, γ-glycidoxypropylmethyl-dimethoxysilane, γ-glycidoxypropylmethyldiethoxysilane, γ-glycidoxypropyltriethoxysilane, β-(3,4-epoxycyclohexyl) ethyltrimethoxysilane, dimethyldimethoxysilane, methyltrimethoxysilane, tetramethoxysilane, methyldimethoxysilane, dimethyldiethyoxysilane, methyltriethoxysilane, tetraethoxysilane, n-hexyltrimethoxysilane, n-octyltrimethoxysilane, n-decyltrimethoxysilane, n-octadecyltrimethoxysilane, ethyltriethoxsilane, phenyltriethoxysilane, γ-methacryloxypropyltrimethoxysilane, γ-mercaptopropyltrimethoxysilane, bis(triethoxysilyl)ethane, bis(trimethoxysilyl)ethane or so may be mentioned.

In case of using the urethane polymer having (meth) acrylate group, vinyl group in the component A, it is preferable to use (meth)acrylate monomer, and vinyl monomer as the monomer having the polymerizable group. As for the example of (meth)acrylate monomer and the vinyl monomer, glycidyl(meth)acrylate, methyleneglycidyl (meth)acrylate, ethyleneglycidyl (meth)acrylate, trimethylolpropane tri(meth)acrylate, tetramethylolmethane tri(meth) acrylate, trimethylolpropane tri(meth)acrylate, tetramethylolmethane tetra(meth)acrylate, pentaerythritol tri(meth) acrylate, pentaerythritol tetra(meth)acrylate, polyethyleneglycol (meth)acrylate having the average molecular weight of 250 to 1000, polytetramethyleneglycol (meth)acrylate having the average molecular weight 250 to 1000, polypropyleneglycoldi(meth)acrylate having the average molecular weight of 250 to 1000, 2,2-bis[(4-(meth) acryloxy.polyethoxy)phenyl]propane, 2,2-bis[(4-(meth) acryloxy.diethoxy)phenyl]propane, ethyleneglycol di(meth) acrylate, diethyleneglycol di(meth)acrylate, triethyleneglycol di(meth)acrylate, tetraethyleneglycol di(meth)acrylate, 1,6-hexanediol di(meth)acrylate, styrene, α-methylstyrene, methylvinylbenzeme, ethylvinylbenzene, α-chlorostyrene, chlorovinylbenzene, vinylbenzylchloride, paradivinylbenzene, methadivinylbenzene or so may be mentioned.

Also, various urethane (meth)acrylate monomer can be used as well, and as for the urethane (meth)acrylate monomer, the urethanedi(meth)acrylate or so controlled to have the molecular weight of 1300 to 10000 by reacting 2-hydroxy(meth)acrylate and the urethane prepolymer obtained by reacting;

hexamethylene diisocyanate, isophorone diisocyanate, lysine isocyanate, 2,2,4-hexamethylene diisocyanate, dicyclohexylmethane diisocyanate, norbornene diisocyanate or methylcyclohexane diisocyanate, and known diols such as polyalkylene glycol having the repeating unit of ethylene oxide having the carbon atoms of 2 to 4, propyleneoxide, hexamethyleneoxide or so, or polyesterdiol such as polycaprolactine diol or so, polycarbonate diol, and polybutadienediol or so.

In case of using the urethane polymer having the epoxy group to the component A, it is preferable to use the epoxy based monomer as the monomer having the polymerizable group. As the example of the epoxy based monomer, apliphatic epoxy compounds such as 1,6-hexanedioldiglycidylether, ethyleneglycoldiglycidylether, diethyleneglycoldiglycidylether, triethyleneglycoldiglycidylether, tetraethyleneglycoldiglycidylether, nonaethyleneglycoldiglycidylether, propyleneglycoldiglycidylether, dipropyleneglycoldiglycidylether, tripropyleneglycoldiglycidylether, tetrapropyleneglycoldiglycidylether, nonapropyleneglycoldiglycidylether, neopentylglycoldiglycidylether, diglycidylether of neopentylglycolhydroxypivalate, trimethylolpropanediglycidylether, trimethylolpropanetriglycidylether, glyceroldiglycidylether, glyceroltriglycidylether, diglyceroldiglycidylether, diglyceroltriglycidylether, diglyceroltetraglycidylether, pentaerythritoldiglycidylether, pentaerythritoltriglycidylether, pentaerythritoltetraglycidylether, dipentaerythritoltetraglycidylether, sorbitoltetraglycidylether, diglycidylether of tris (2-hydroxyethyl)isocyanurate, triglycidylether of tris(2-hydroxyethyl)isocyanurate or so; alicyclic epoxy compounds such as isophoronedioldiglycidylether, bis-2,2-hydroxycyclohexylpropanediglycidylether or so; aromatic epoxy compounds such as resorcindiglycidylether, bisphenol A diglycidylether, bisphenol F diglycidylether, bisphenol S diglycidylether, ortho phthalic acid diglycidylester, phenol novolac polyglycidylether, cresol novolac polyglycidylether or so may be mentioned.

Note that, the monomer having said polymerizable group needs to be blended so that per 100 g of entire component having the polymerizable group included in the photochromic composition satisfies said range. In case the mol number of the polymerizable group satisfies said range only by said urethane polymer (A), the monomer having the polymerizable group does not need to be blended, or the mol number of the polymerizable group per 100 g of entire component having the polymerizable group can be blended so that it satisfies said range. In case of blending the monomer having the polymerizable group, as the preferable range, it satisfies said range, and it is 0.1 to 30 parts by mass and preferably 1 to 15 parts by mass with respect to 100 parts by mass of the urethane polymer (A) having the polymerizable group.

(Other Components)

Further, in the photochromic composition used for the present invention, for the improvement of the durability of the photochromic compound, for the improvement of the color optical density, for the improvement of the color fading speed or the film forming property; the surfactant, the antioxidant, the radical capturing agent, the ultraviolet stabilizer, the ultraviolet absorbing agent, the releasing agent, the coloration inhibitor, the anti-static agent, the fluorescent die, the coloring dye, the pigment, the aromatic agent, the plasticizer or so may be added. As for these additives which are added, the known compounds are used without any limitations.

For example, as the surfactant, any of nonionic, anionic, cationic can be used, however it is preferable to use nonionic surfactants from the point of the solubility to the photochromic compositions. As the specific nonionic surfactant able to be used suitably, sorbitan fatty acid ester, glycerin fatty acid ester, decaglycerin fatty acid ester, propylene glycolpentaerythritol fatty acid ester, polyoxyethylene sorbitan fatty acid ester, polyoxyethylenesorbitan fatty acid ester, polyoxyethyleneglycerin fatty acid ester, polyethyleneglycol fatty acid ester, polyoxyethylenealkylether, polyoxyethylenephytosterolphytostanol, polyoxyethylenepolyoxypropylenealkylether, polyoxyethylenealkylphenylether, polyoxyethylene caster oil.curable caster oil, polyoxyethylenelanolinelanorine alcohol.beeswax derivatives, polyoxyethylenealkylamine.fatty acid amine, polyoxyethylenealkylphenylformaldehyde condensation product, single chain polyoxyethylenealkylether, and further the surfactant of silicones or fluorine can be mentioned.

For the use of the surfactant, it may be used by mixing two or more thereof. The added amount of the surfactant is preferably within the range of 0.001 to 1 parts by mass with respect to 100 parts by mass of the urethane polymer (the component A).

Also, as the antioxidant, the radical capturing agent, the ultraviolet stabilizer, and the ultraviolet absorbing agent; the hindered amine photo stabilizer, the hindered phenol antioxidant, the phenol radical capturing agent, the sulfur antioxidant, the phosphorous antioxidant, the triazine compounds, the benzotriazol compounds, the benzophenone compounds or so can be suitably used. These antioxidant, radical capturing agent, ultraviolet stabilizer, ultraviolet absorbing agent may be used by combining two or more thereof. Further, for the use of these additives, the antioxidant, the radical capturing agent, the ultraviolet stabilizer and the ultraviolet absorbing agent, and the surfactant may be used together. The added amount of these antioxidant, radical capturing agent, ultraviolet stabilizer, ultraviolet absorbing agent is preferably within the range of 0.001 to 20 parts by mass with respect to 100 parts by mass of the urethane polymer (the component A). Note that, if these additives are used too much, the adhesiveness of the photochromic composition to the optical sheet or film made of polycarbonate resin declines, thus the added amount is preferably 7 parts by mass or less, more preferably 3 parts by mass or less, and most preferably 1 part by mass or less.

In the photochromic composition used in the present invention, in order to improve the adhesiveness between the photochromic adhesive sheet and the optical sheet, the tackifier may be added. Specifically, terpene resin, terpene phenol resin, phenol resin, hydrogenated terpene resin, rosin resin, xylene resin, acrylic based tackifier, silicone based tackifier, urethane based tackifier or so may be mentioned.

In the photochromic composition used in the present invention, in order to improve the heat resistance of the photochromic adhesive sheet and to reduce the solubility to the polymerizable monomer, the inorganic oxide fine particle and organic/inorganic composite material or so may be added. As for the inorganic oxide fine particles, the metal oxide sol such as silica sol dispersed in the organic solvent such as methanol, methylethylketone, propyleneglycolmonomethylether or so; as the organic/inorganic hybrid material, silica/melamine hybrid material, silica/urethane hybrid material, silica/acrylic hybrid material, silica/epoxy resin hybrid material or so may be mentioned.

(The Production Method of the Photochromic Composition)

The photochromic composition of the present invention can be produced by mixing the above mentioned component A and the component B, and the component C which are added if needed, the component D, the monomer having the polymerizable group and other components. The order of mixing of each component is not particularly limited. Note that, in case of blending the polymerization initiator, it is preferable to mix right before the use of the photochromic composition.

For example, in case the organic solvent is not used, each component can be melt kneaded and the photochromic composition can be made into a pellet, and also it can be sheet molded. Also, in case of using the organic solvent, the photochromic composition can be obtained by dissolving each component to the organic solvent.

(The Mol Number of the Polymerizable Group Included in the Photochromic Composition)

In the photochromic composition of the present invention obtained by the above mentioned method, a mol number of the polymerizable group per 100 g of an entire component having the polymerizable group included in the photochromic composition must be;

(1) 10 mmol or more and 250 mmol or less, in case the polymerizable group is a silanol group or a group forming the silanol group by hydrolysis;

(2) 10 mmol or more and 200 mmol or less, in case the polymerizable group is (meth)acrylate group, epoxy group, and vinyl group.

Among these, in case the polymerizable group is the (meth)acrylate group, the epoxy group, and the vinyl group, it is preferably 10 mmol or more and 150 mmol or less, and most preferably 20 mmol or more and 100 mmol or less.

On the other hand, in case the polymerizable group is a silanol group or the group capable of forming the silanol group by hydrolysis, then said range is preferably 20 mmol or more and 200 mmol or less, more preferably 30 mmol or more and 150 mmol or less. Note that, the mol number of the polymerizable group refers to the mol number of the part relating to the polymerization. Therefore, in case the polymerizable group is dialkoxysilyl group, and if 1 mmol of dialkoxysilyl group is present, it converts to 2 mmol of polymerizable group.

The present invention exhibits an excellent effect by having the particular ratio of the mol number of the polymerizable group. This mol number is a mol number per 100 g of entire component having the polymerizable group included in the photochromic composition of the present invention; and the entire component refers to the total sum of the urethane polymer (the component A) and the monomer having said polymerizable group which is blended arbitrarily. Further, the mol number of the polymerizable group included in each component (the urethane polymer (the component A), and the monomer having the polymerizable group) using the below equation, then the mol number is obtained from a value of the total sum thereof.

The mol number of the polymerizable group of each component=(the number of the polymerizable group included in one molecule of said component)×{the used amount (g) of said each component per 100 g of the entire component having the polymerizable group}/(the molecular weight of the component).

Note that, for the molecular weight of the component A, the molecular weight of the peak top obtained from GPC was used.

The mol number of the polymerizable group per 100 g of the entire component having the polymerizable group included in the photochromic composition can be controlled based on the number of the polymerizable group introduced in the urethane polymer (the component A), the used amount, the molecular weight of the peak top, and the blending amount, the number of the polymerization group and the molecular weight of the monomer having the polymerizable group mixed depending on the needs. Therefore, in case the mol number of the polymerizable group per 100 g of the entire component is the same as the number of the polymerizable group included in one molecule, it becomes higher if the low molecular weight urethane polymer (the component A) is used, and it becomes lower if the high molecular weight urethane polymer (the component A) is used.

In case the mol number of the polymerizable group included in the photochromic composition is less than the lower limit of said range, the crosslinking density of the obtained photochromic adhesive layer is not sufficient, hence the solvent resistance against the polymerizable monomer is not sufficient. In case the mol number of the polymerizable group exceeds the upper limit of said range, the crosslinking density of the obtained photochromic adhesive layer becomes high, and the adhesive layer becomes hard, thus the adhesiveness to the optical sheet or the optical film declines.

The photochromic composition of the present invention obtained as such can be suitably used as the photochromic adhesive agent for bonding the optical sheet or film made of photochromic adhesive agent, particularly made of polycarbonate resin. Further, by bonding the optical sheets or films against each other via the adhesive layer consisting of the photochromic composition of the present invention, the optical article can be obtained. Hereinafter, the optical article and the production method thereof will be described.

(The Optical Article of the Present Invention)

The optical article has the laminated structure wherein two optical sheets or films facing each other are bonded via the adhesive layer consisting of the photochromic composition of the present invention. As for such optical article; the photochromic laminated sheet or film formed only by the above mentioned laminated structure (hereinafter, it may be simply referred as the laminated article); the complex laminated article in which the optical sheet or film is further laminated or the coating layer such as hard coat layer or so are formed on the above mentioned laminated sheet or film; the optical article wherein the optical base material such as plastic lens body or so are made one body with the above mentioned complex laminated article and the photochromic laminated article thereof or so may be mentioned. As for the method for making as one body with the optical base material such as the plastic lens or so, for example, the method of injection molding the thermoplastic resin for constituting the optical base material (for example, the lens body) such as polycarbonate resin or so after installing the photochromic laminated article or so of the present invention in the metal mold (hereinafter it may be simply referred as the injection molding method), or the method of pasting the laminated sheet or so of the above mentioned present invention by the adhesive agent to the surface of the optical base material, or the method of embedding the photochromic laminated article into the polymerizable monomer and polymerizing the polymerizable monomer or so may be mentioned. Hereinbelow, these material or the parts consisting the optical article of the present invention will be explained.

(The Optical Sheet and the Film)

In the present invention, as the optical sheet or film, and the optical base material, the sheet and the film, and the optical base material having the optical transparency can be used without particular limitation; however, it is suitable to use those made of resin as it is easy to obtain and easy to process. As examples of the resins as the material of the optical sheet or film, and the optical base material; polycarbonate resin, polyethylenetelephthalate resin, nylon resin, triacetylcellulose resin, acrylic resin, urethane resin, allyl resin, epoxy resin, polyvinyl resin or so may be mentioned. Among these, polycarbonate resin is particularly preferable since it has good adhesiveness and high applicability against the injection molding. Also, the polarizing film (those which the polyvinyl alcohol polarizing film being sandwiched between the triacetylcellulose resin film) can be used as the optical film of the present invention.

The two optical sheet facing against each other in the present invention may be a sheet formed of same resin or it may be different.

The thickness of this optical sheet or the optical film is not particularly limited, however usually it is 50 µm to 1 mm, and preferably 0.1 mm to 0.5 mm. If it is thinner than 50 µm, the optical sheet or the optical film may be strained when curing while the optical sheet or the film is embedded in the polymerizable monomer as the base material. On the other hand, in case the thickness of the optical sheet or the film exceeds the thickness of 1 mm, then the obtained photochromic lens becomes thick hence it may become difficult to perform curved surface processing.

Also, as the optical sheet or the optical film used in the present invention, those reformed by known method can be used. For example, in order to improve the adhesiveness by said photochromic composition, those which has modified surface can be used. As for the method of modifying, it is not particularly limited, and a chemical treatment such as a corona treatment, a flame treatment, acid, alkaline treatment or so can be mentioned. Also, in order to have other function besides the improvement of the adhesiveness, laminated optical sheet or film, the optical sheet or film having coating layer can be used.

(The Production Method of the Photochromic Laminated Article)

The photochromic laminated article of the present invention is produced by bonding two optical sheets or films facing each other via the adhesive layer consisting of the photochromic composition of the present invention. Note that, the thickness of the above mentioned first adhesive layer is 5 to 100 µm; more preferably it is 10 to 50 µm from the point of the color optical density, the weather resistance and the adhesive strength of the photochromic compound.

The above mentioned adhesive layer can be obtained from the following method depending on the property of the photochromic composition used. That is, in case the photochromic composition of the present invention is controlled to a suitable viscosity by adding the organic solvent or so; the photochromic composition of the present invention is coated to the one of the optical sheet or film, and after carrying out the drying (heating) depending on the needs, other optical sheet or film may be (heat) pressure adhered. Here, as for the coating method of the photochromic composition, the known methods such as a spin coat method, a spray coat method, a dip coat method, a dip spin coat method, a dry lamination method or so can be used without any limitation. The coating and the drying of the above mentioned photochromic composition is preferably carried out at the temperature of the room temperature to 100° C., the humidity of 10 to 100% RH. Particularly, in case the component C is present, by carrying out the coating and the drying under this condition, the hydrolysis of the component C is promoted, and further strong adhesive force can be obtained. Also, during the drying, part of the polymerizable group is thought to be reacted.

In case of using the photochromic composition of the present invention including the organic solvent, the laminated article of the present invention can be produced by a step of preparing a photochromic adhesive sheet comprising said urethane polymer (A), the photochromic compound (B), and a monomer having the polymerizable group blended depending on the needs, by removing the organic solvent (D) by drying after extending the photochromic composition on the flat and smooth substrate, then further releasing the smooth substrate, and a step of making a laminated structure by polymerizing the polymerizable group after binding two optical sheets or the optical films by placing said photochromic adhesive sheet in between the two optical sheets or the optical films facing against each other.

As for the material of the flat and smooth base material, those having the resistance to the solvent used in the present invention, or those which the urethane polymer of the present invention can be released easily are preferable, and for specific example, glass, stainless, polytetrafluoroethylene, polyethylenetelephthalate, polyethylene, polypropylene, and the plastic film laminated with the coat layer which improves the releasability such as silicones or fluorines may be mentioned. In case of employing such method, regardless of the type of the solvent and the type of the optical sheet or film, the adverse effect caused by the use of the solvent can be eliminated.

Next, the photochromic adhesive sheet produced on the flat and smooth substrate is released from the substrate and inserted in between the two optical sheet or the optical film facing against each other. Then, the optical sheet or the optical film may be bonded by known method such as pressure adhering (heat pressure adhering). At this time, by setting the condition for said urethane polymer included in the photochromic adhesive sheet and the polymerizable group of the monomer having the polymerizable group to carry out the polymerization, the laminated structure is formed.

As the condition for said urethane polymer included in the photochromic adhesive sheet and the polymerizable group of the monomer having the polymerizable group to carry out the polymerization, it may be set to the condition so that each polymerizable group can carry out the polymerization. Usually, since said polymerizable group has good polymerizability, it may be carried out by heating or light irradiating under the condition with the polymerization initiator. The polymerization initiator may be applied depending on each polymerizable group, and those mentioned in the above may be used. Specifically, in case of carrying out the heat applying, it is preferably 40° C. or higher and 130° C. or less, can the heat applying treatment may be carried out in the convection oven or so.

Also, in case of irradiating the light, a metal halide, an extra high pressure mercury lamp, or an electrodeless lamp or so can be used as the light source in inert gas or air. Further, the heat applying treatment or so may be carried out after the light irradiation. By carrying out the aforementioned heat applying, and/or the light irradiation, the optical film or the optical sheet can be bonded stronger.

Further, in case of using the photochromic composition of the present invention without the organic solvent, the photochromic adhesive sheet can be produced by co-extrusion molding Or so.

The photochromic laminated article obtained by the above mentioned method may be used as it is, however it can be used by stabilizing the condition thereof by the following method. During this stabilizing treatment, the polymerizable group may be reacted. Specifically, it is preferable to leave the laminated article just bonded at the temperature of 20° C. or higher and 60° C. or less for 12 hours or longer. The upper limit for the time for leaving is not particularly limited, however, 50 hours or so is sufficient. Also it can be left at normal pressure, or it can be left under vacuumed condition. Further, this laminated sheet being left is preferably left at the temperature of 80° C. or higher and 130° C. or less for 30 minutes to 3 hours (hereinafter, it will be considered as the heat treatment). By carrying out this heat applying treatment, most of the polymerizable group is thought to polymerize. Therefore, by inserting said photochromic adhesive sheet in between the two optical sheet or the optical film which are facing against each other, then the bonded laminated structure is left under said condition followed by said heat applying treatment; thereby the photochromic laminated article can be formed as well.

In case of using the photopolymerization initiator, said heat applying treatment can be carried out under the light irradiation, or the light irradiation can be carried out after the heat applying treatment. Also, in case of using said isocyanate compound (C), in order to completely consume the isocyanate group remaining in said photochromic laminated article, it is preferably further left under the condition at 20 to 100° C., and the humidity of 40 to 100% RH. Further, after the moisturizing treatment, by leaving under normal pressure or the vacuumed condition, at 40 to 130° C., extra water present in the laminated sheet can be removed.

Also, in the present invention, from the point to improve the adhesiveness, it is preferable to add the isocyanate compound component (C) having at least one isocyanate group within the molecule to the photochromic composition of the present invention, and in such case the photochromic laminated article of the present invention can be produced as same as mentioned in the above. Here, in case the step of preparing the photochromic adhesive sheet and the photochromic laminated article is carried out under the present moisture (humidity), at least part of said isocyanate compound (C) included in the photochromic adhesive sheet and the photochromic laminated article have become the reaction product.

(The Used Examples of the Photochromic Laminated Article (the Production of the Photochromic Lens))

Said photochromic laminated sheet preferably uses the optical base material by bonding on at least one face thereof. As such optical base material, the thermoplastic resin such as above mentioned polycarbonate resin or so may be mentioned. In this case, the thermoplastic resin can be layered on the photochromic laminated article by the injection molding.heat pressure adhering. The adhesive sheet formed of the photochromic composition of the present invention has improved adhesiveness and the heat resistance, thus it can be suitably used in case of producing the photochromic lens in such method.

Also, for said photochromic laminated article, the polymerizable monomer is cured after embedding in the polymerizable monomer, thereby the thermoplastic resin can be layered on the laminated article. As for the polymerizable monomer, the thermoplastic resin such as (meth)acrylate monomer, allyl monomer composition, thiourethane based monomer composition, urethane based monomer composition, thioepoxy based monomer composition or so may be mentioned. The adhesive sheet formed by the photochromic composition of the present invention has improved solvent resistance, it can be suitably used in case of producing the photochromic lens by such method.

EXAMPLE

Hereinafter, the present invention will be described in further detail, by using the examples. These examples are to simply describe the present invention, and the scope and the spirit of the present invention is not to be limited to these examples. Hereinafter, the abbreviation of the compounds or so used as each component in the examples and the comparative examples are listed.

(The Component A1; the Polyol Compound)

PL1: "DURANOL™" made by Asahi Kasei Chemicals Corporation (polycarbonate diol having 1,5-pentane diol and hexane diol as the material, the number average molecular weight of 800).

PL2: "PRACCEL™" made by DAICEL CORPORATION (polycaprolactone diol, the number average molecular weight of 830).

PL3: polypropylenediol made by ASAHI GLASS CO., LTD (the number average molecular weight of 700).

(The Component A2; the Polyisocyanate Compound)
  NCO1:isophorone diisocyanate
  NCO2:dicyclohexylmethane-4,4'-diisocyanate
  NCO3:toluene-2,4-diisocyanate (The Component A3; the Chain Extender)
  CE1:isophorone diamine
  CE2:4,4'-methylenebis(cyclohexylamine)

(The Component A4; the Polymerizable Group Imparting Compound Having the Polymerizable Group)
  RC1: aminopropyltrimethoxy silane
  RC2: 2-hydroxyethyl acrylate
  RC3: butanediolmonoglycidylether
  RC4: allyl alcohol
  RC5: N-β(aminoethyl)-γ-aminopropyltriethoxy silane
  RC:6 the compound shown in the below formula RC7: the compound shown in the below formula

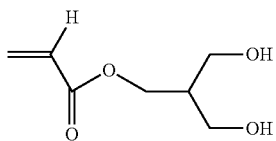

[Chemical formula 18]

RC8: the compound shown in the below formula

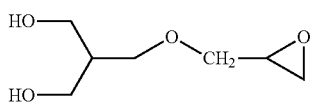

[Chemical formula 19]

RC9: the compound shown in the below formula

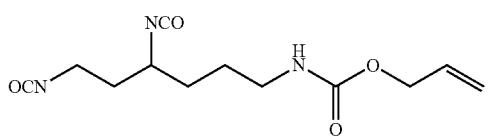

[Chemical formula 20]

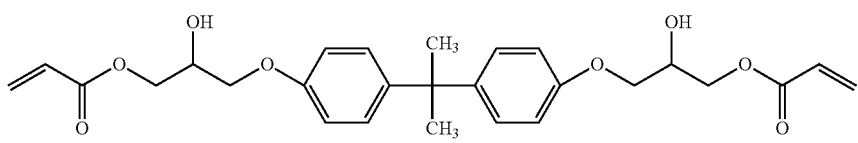

[Chemical formula 21]

(The Component A5: The Reaction Terminator)
S1; 1-methyl-2,2,6,6,-tetramethyl-4-aminopiperidine
(The Component B: The Photochromic Compound)
PC1: the compound shown in the below formula

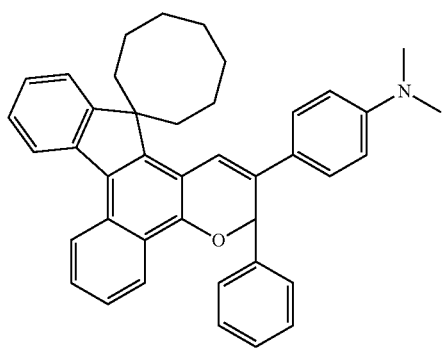

[Chemical formula 22]

(The Component C; the Isocyanate Compound)
C1: isophorone diisocyanate (the molecular weight of 222)
C2: dicyclohexylmethane4,4'-diisocyanate (the molecular weight of 262)

(The Component D: The Organic Solvent)
D1: propyleneglycol-mono-methylether
D2: THF (tetrahydrofuran)
(The Monomer Having the Polymerizable Group)
M1: γ-glycidoxypropyltrimethoxysilane
M2: methyltrimethoxysilane
M3: ethyleneglycoldiacrylate
M4: 1,6-hexanedioldiglycidylether
(The Polymerization Initiator)
P1: 0.001N hydrochloric acid aqueous solution
P2: di-tert-butylperoxydicarbonate
P3: diethylenetriamine
P4: diisopropylperoxydicarbonate
P5: Irgacure 1800 {mixture of 1-hydroxycyclohexylphenylketone and bis(2,6-dimethoxybenzoyl)-2,4,4-trimethylpentylphosphineoxide (weight ratio of 3:1)}
(The Component A: The Preparation of the Urethane Polymer Having the Polymerizable Group (U1))

234 g of polycarbonate polyol (PL1) having the number average molecular weight of 800 and 100 g of isophorone diisocyanate (NCO1) were added into the three-necked flask having a stirring blade, a cooling pipe, a thermometer, and nitrogen gas introducing pipe; and reacted under nitrogen atmosphere at 80° C. for 6 hours to obtain the prepolymer. Then, after adding 1500 ml of THF, 15.3 g of isophorone diamine (CE1) was added by dropping in the nitrogen atmosphere, then reacted for 1 hour at 25° C. after the dropping was completed; thereby the urethane polymer having the isocyanate group at the end terminal of the molecule was prepared.

Then, 16.1 g of aminopropyltrimethoxysilane (RC1) was added to said solution under the nitrogen atmosphere, and reacted for 1 hour at 25° C., then the solvent was removed under the reduced pressure; thereby the urethane polymer (U1) having the trimethoxysilyl group at the end terminal of the urethane resin was obtained. The molecular weight of the obtained urethane polymer having the polymerizable group was 5000 (the theoretical value: 5000) in terms of polystyrene. The theoretical value of the molecular weight mentioned here refers to the molecular weight in case the component A1, the component A2, the component A3 and the component A4 which were used as the source material forms the theoretically straight urethane polymer without making crosslink.

(The Component A: The Preparation of the Urethane Polymer (U2 to U4, U14 to U21 and U26) Having the Polymerizable Group)

By using the polyol compound shown in Table 1 (the component A1), the polyisocyanate compound (the component A2), the chain extender (the component A3), the compound having the polymerizable group (the component A4), and the reaction solvent, and except for using the reaction condition shown in Table 1; U2 to U4, U14 to U21 and U26 were prepared as same as the preparation method of aforementioned U1. The preparation condition of the obtained urethane polymer having the polymerizable group is shown in Table 1.

(The Component A: The Preparation of the Urethane Polymer (U5) Having the Polymerizable Group)

234 g of polycarbonate polyol (PL1) having the number average molecular weight of 800 and 100 g of isophorone diisocyanate (NCO1) were added into the three-necked flask having a stirring blade, a cooling pipe, a thermometer, and nitrogen gas introducing pipe; and reacted under nitrogen atmosphere at 80° C. for 6 hours to obtain the prepolymer. Then, after adding 1500 ml of THF, 15.3 g of isophorone diamine (CE1) was added by dropping in the nitrogen atmosphere, then reacted for 1 hour at 25° C. after the dropping was completed; thereby the urethane polymer having the isocyanate group at the end terminal of the molecule was prepared.

Then, 16.1 g of aminopropyltrimethoxysilane (RC1) was added to said solution under the nitrogen atmosphere, and reacted for 1 hour at 25° C., and 7.7 g of 1-methyl-2,2,6,6-tetramethyl-4-aminopiperidine (S1) was added, and reacted for 1 hour at 25° C. then the solvent was removed under the reduced pressure; thereby the urethane polymer (U5) having the trimethoxysilyl group and the piperidine ring at the end terminal of the urethane resin was obtained. The molecular weight of the obtained urethane polymer (U5) having the polymerizable group was 5000 (the theoretical value: 5000) in terms of polystyrene.

(The Component A: The Preparation of the Urethane Polymer (U6 to U13) Having the Polymerizable Group)

By using the polyol compound (the component A1), the polyisocyanate compound (the component A2), the chain extender (the component A3), the compound having the polymerizable group (the component A4), the reaction terminator (the component A5) and the reaction solvent shown in Table 1, and except for using the reaction condition shown in Table 1, U6 to U13 were prepared as same as the preparation method of aforementioned U5. The preparation condition of the obtained urethane polymer having the polymerizable group is shown in Table 1.

(The Component A: The Preparation of the Urethane Polymer (U22) Having the Polymerizable Group)

234 g of polycarbonate polyol (PL1) having the number average molecular weight of 800 and 100 g of isophorone diisocyanate (NCO1) were added into the three-necked flask having a stirring blade, a cooling pipe, a thermometer, and nitrogen gas introducing pipe; and reacted under nitrogen atmosphere at 80° C. for 6 hours to obtain the prepolymer. Then, after adding 1500 ml of THF, 15 g of N-β-(aminoethyl)-γ-aminopropyltriethoxysilane (RC5) was added by dropping in the nitrogen atmosphere, then reacted for 2 hours at 25° C., then 11.5 g of isophorone diamine (CE1) was further added and reacted for 1 hour at 25° C., followed by adding 7.7 g of 1-methyl-2,2,6,6-tetramethyl-4-aminopiperidine (S1) and react for 1 hour at 25° C. then the solvent was removed under the reduced pressure; thereby the urethane polymer (U22) having the trimethoxysilyl group at the side chain of the urethane polymer was prepared. The molecular weight of the obtained urethane polymer (U22) having the polymerizable group was 17000 (the theoretical value: 16000) in terms of polystyrene.

(The Component A: The Preparation of the Urethane Polymer (U23, U24, and U27) Having the Polymerizable Group)

By using the polyol compound (the component A1), the polyisocyanate compound (the component A2), the chain extender (the component A3), the compound having the polymerizable group (the component A4), the reaction terminator (the component A5) and the reaction solvent shown in Table 1, and except for using the reaction condition shown in Table 1, U23, U24 and U27 were prepared as same as the preparation method of aforementioned U22. The preparation condition of the obtained urethane polymer having the polymerizable group is shown in Table 1.

(The Component A: The Preparation of the Urethane Polymer (U25) Having the Polymerizable Group)

234 g of polycarbonate polyol (PL1) having the number average molecular weight of 800 and 85 g of isophorone diisocyanate (NCO1) and 18 g of diisocyanate compound obtained from the reaction between allyl alcohol and 1,3,6-hexamethylene triisocyanate were added into the three-necked flask having a stirring blade, a cooling pipe, a thermometer, and nitrogen gas introducing pipe; and reacted under nitrogen atmosphere at 80° C. for 6 hours to obtain the prepolymer. Then, after adding 1500 ml of THF, 23 g of isophorone diamine (CE1) was added by dropping in the nitrogen atmosphere, then reacted for 1 hour at 25° C., followed by adding 7.7 g of 1-methyl-2,2,6,6-tetramethyl-4-aminopiperidine (S1) and react for 1 hour at 25° C. then the solvent was removed under the reduced pressure; thereby the urethane polymer (U25) having the allyl group at the side chain of the urethane resin was prepared. The molecular weight of the obtained urethane polymer (U25) having the polymerizable group was 15000 (the theoretical value: 16000) in terms of polystyrene.

Also, the result of the blending amount, the molecular weight, and the content of the polymerizable group of the component A1, A2, A3, A4 and A5 of the obtained polyurethane resin U1 to U27 are shown in Table 2.

TABLE 1

| Urethane polymer | Urethane polymer preparation condition | | | | | | Diluting solvent | | Chain extender reaction condition | | | |
| --- | --- | --- | --- | --- | --- | --- | --- | --- | --- | --- | --- | --- |
| | A1 added | | A2 added | | Reaction condition | | | | A3 added | | Reaction condition | |
| | Type | amount (g) | Type | amount (g) | Temp. (° C.) | Time (h) | Type | amount (ml) | Type | amount (g) | Temp. (° C.) | Time (h) |
| U1 | PL1 | 234 | NCO1 | 100 | 80 | 6 | THF | 1500 | CF1 | 15.3 | 25 | 1 |
| U2 | PL1 | 234 | NCO1 | 100 | 80 | 6 | DMF | 1500 | CF1 | 15.3 | 25 | 1 |
| U3 | PL1 | 234 | NCO1 | 100 | 80 | 6 | DMF | 1500 | CF1 | 15.3 | 25 | 1 |
| U4 | PL1 | 234 | NCO1 | 100 | 80 | 6 | DMF | 1400 | CF1 | 15.3 | 25 | 1 |
| U5 | PL1 | 234 | NCO1 | 100 | 80 | 6 | THF | 1500 | CF1 | 15.3 | 25 | 1 |
| U6 | PL1 | 234 | NCO1 | 100 | 80 | 6 | DMF | 1500 | CF1 | 15.3 | 25 | 1 |
| U7 | PL1 | 252 | NCO1 | 100 | 80 | 6 | THF | 1500 | CF1 | 14.6 | 25 | 1 |
| U8 | PL1 | 252 | NCO1 | 100 | 80 | 6 | THF | 1500 | CF1 | 16.9 | 25 | 1 |
| U9 | PL1 | 230 | NCO1 | 100 | 80 | 6 | THF | 1500 | CF1 | 13.8 | 25 | 1 |
| U10 | PL1 | 223 | NCO1 | 100 | 80 | 6 | THF | 1500 | CF1 | 12.3 | 25 | 1 |

TABLE 1-continued

| Urethane polymer | | | | | | | | | | | | |
|---|---|---|---|---|---|---|---|---|---|---|---|---|
| U11 | PL1 | 212 | NCO1 | 100 | 80 | 6 | DMF | 1400 | CF1 | 10 | 25 | 1 |
| U12 | PL1 | 205 | NCO1 | 100 | 80 | 6 | DMF | 1400 | CF1 | 77 | 25 | 1 |
| U13 | PL1 | 187 | NCO1 | 100 | 80 | 6 | DMF | 1400 | CF1 | 77 | 25 | 1 |
| U14 | PL1 | 126 | NCO1 | 100 | 80 | 6 | THF | 1100 | CF1 | 46 | 25 | 1 |
| U15 | PL1 | 152 | NCO1 | 100 | 80 | 6 | THF | 1200 | CF1 | 41 | 25 | 1 |
| U16 | PL1 | 180 | NCO1 | 100 | 80 | 6 | THF | 1300 | CF1 | 34 | 25 | 1 |
| U17 | PL1 | 281 | NCO1 | 100 | 80 | 6 | THF | 1600 | CF1 | 13 | 25 | 1 |
| U18 | PL1 | 299 | NCO1 | 100 | 80 | 6 | THF | 1700 | CF1 | 9 | 25 | 1 |
| U19 | PL2 | 252 | NCO1 | 100 | 80 | 6 | THF | 1500 | CF1 | 19 | 25 | 1 |
| U20 | PL1 | 213 | NCO2 | 100 | 80 | 6 | THF | 1400 | CF1 | 19 | 25 | 1 |
| U21 | PL1 | 213 | NCO2 | 100 | 80 | 6 | THF | 1400 | CF2 | 20 | 25 | 1 |
| U22 | PL1 | 234 | NCO1 | 100 | 80 | 6 | THF | 1500 | CF1 | 11.5 | 25 | 1 |
| U23 | PL1 | 234 | NCO1 | 100 | 80 | 6 | THF | 1500 | CF1 | 11.5 | 25 | 1 |
| U24 | PL1 | 234 | NCO1 | 100 | 80 | 6 | THF | 1500 | CF1 | 11.5 | 25 | 1 |
| U25 | PL1 | 234 | NCO1 | 85 | 80 | 6 | THF | 1500 | CF1 | 23 | 25 | 1 |
| U26 | PL1 | 213 | NCO2 | 100 | 80 | 6 | THF | 1500 | CF1 | 19 | 25 | 1 |
| U27 | PL1 | 458 | NCO2 | 100 | 80 | 6 | THF | 1500 | — | — | — | — |
| U28-a | PL3 | 211 | NCO2 | 118 | 80 | 9 | — | — | — | — | — | — |
| U28-b | PL3 | 241 | NCO3 | 30 | 80 | 9 | — | — | — | — | — | — |
| U29-a | PL1 | 289 | NCO1 | 120 | 80 | 9 | — | — | — | — | — | — |
| U29-b | PL1 | 276 | NCO3 | 30 | 80 | 9 | — | — | — | — | — | — |

| | Polymerizable group imparting compound reaction condition | | | | Reaction terminator reaction condition | | | |
|---|---|---|---|---|---|---|---|---|
| | A4 | | Reaction condition | | A5 | | Reaction condition | |
| Urethane polymer | Type | added amount (g) | Temp. (° C.) | Time (h) | Type | added amount (g) | Temp. (° C.) | Time (h) |
| U1 | RC1 | 16.1 | 25 | 1 | — | — | — | — |
| U2 | RC2 | 10.5 | 110 | 6 | — | — | — | — |
| U3 | RC3 | 13.1 | 110 | 6 | — | — | — | — |
| U4 | RC4 | 5.2 | 110 | 6 | — | — | — | — |
| U5 | RC1 | 16.1 | 25 | 1 | S1 | 77 | 25 | 1 |
| U6 | RC2 | 10.5 | 110 | 6 | S1 | 77 | 25 | 1 |
| U7 | RC1 | 9.8 | 25 | 1 | S1 | 77 | 25 | 1 |
| U8 | RC1 | 4.9 | 25 | 1 | S1 | 77 | 25 | 1 |
| U9 | RC1 | 21.0 | 25 | 1 | S1 | 77 | 25 | 1 |
| U10 | RC1 | 27.4 | 25 | 1 | S1 | 77 | 25 | 1 |
| U11 | RC2 | 24.0 | 110 | 10 | S1 | 77 | 25 | 1 |
| U12 | RC2 | 29.2 | 110 | 10 | S1 | 77 | 25 | 1 |
| U13 | RC2 | 34.5 | 110 | 10 | S1 | 77 | 25 | 1 |
| U14 | RC1 | 8.3 | 25 | 1 | — | — | — | — |
| U15 | RC1 | 8.3 | 25 | 1 | — | — | — | — |
| U16 | RC1 | 8.3 | 25 | 1 | — | — | — | — |
| U17 | RC1 | 8.3 | 25 | 1 | — | — | — | — |
| U18 | RC1 | 8.3 | 25 | 1 | — | — | — | — |
| U19 | RC1 | 8.3 | 25 | 1 | — | — | — | — |
| U20 | RC1 | 8.3 | 25 | 1 | — | — | — | — |
| U21 | RC1 | 8.3 | 25 | 1 | — | — | — | — |
| U22 | RC5 | 15.0 | 25 | 2 | S1 | 77 | 25 | 1 |
| U23 | RC6 | 10.8 | 80 | 5 | S1 | 77 | 25 | 1 |
| U24 | RC7 | 10.9 | 80 | 5 | S1 | 77 | 25 | 1 |
| U25 | RC8 | 18.0 | 80 | 6 | S1 | 77 | 25 | 1 |
| U26 | — | — | — | — | — | — | — | — |
| U27 | RC9 | 147.7 | 80 | 5 | — | — | — | — |
| U28-a | — | — | — | — | — | — | — | — |
| U28-b | — | — | — | — | — | — | — | — |
| U29-a | — | — | — | — | — | — | — | — |
| U29-b | — | — | — | — | — | — | — | — |

TABLE 2

| Reactive group containing Polyurethane resin | Molecular weight | | A1/A2/A3/A4/A5 | Polymerizable group containing amount (mmol/100 g) |
|---|---|---|---|---|
| | in terms of polyoxyethylene | theoretical value | | |
| U1 | 5,000 | 5,000 | 0.65/1.0/0.2/0.1/0 | 74 |
| U2 | 5,000 | 5,000 | 0.65/1.0/0.2/0.1/0 | 25 |
| U3 | 6,000 | 5,000 | 0.65/1.0/0.2/0.1/0 | 25 |
| U4 | 6,000 | 5,000 | 0.65/1.0/0.2/0.1/0 | 25 |
| U5 | 5,000 | 5,000 | 0.65/1.0/0.2/0.1/0.05 | 73 |

TABLE 2-continued

| Reactive group containing Polyurethane resin | Molecular weight | | A1/A2/A3/A4/A5 | Polymerizable group containing amount (mmol/100 g) |
|---|---|---|---|---|
| | in terms of polyoxyethylene | theoretical value | | |
| U6 | 5,000 | 5,000 | 0.65/1.0/0.2/0.1/0.05 | 25 |
| U7 | 8,000 | 9,000 | 0.7/1.0/0.19/0.06/0.05 | 42 |
| U8 | 10,000 | 11,000 | 0.7/1.0/0.22/0.03/0.05 | 21 |
| U9 | 5,000 | 5,000 | 0.64/1.0/0.18/0.13/0.05 | 95 |
| U10 | 5,000 | 4,000 | 0.62/1.0/0.16/0.17/0.05 | 125 |
| U11 | 3,000 | 3,000 | 0.59/1.0/0.13/0.23/0.05 | 59 |
| U12 | 3,000 | 2,000 | 0.57/1.0/0.1/0.28/0.05 | 72 |
| U13 | 3,000 | 2,000 | 0.52/1.0/0.1/0.33/0.05 | 88 |
| U14 | 12,000 | 11,000 | 0.35/1.0/0.6/0.05/0 | 50 |
| U15 | 12,000 | 13,000 | 0.42/1.0/0.53/0.05/0 | 46 |
| U16 | 15,000 | 14,000 | 0.5/1.0/0.45/0.05/0 | 43 |
| U17 | 18,000 | 18,000 | 0.78/1.0/0.17/0.05/0 | 35 |
| U18 | 18,000 | 18,000 | 0.83/1.0/0.12/0.05/0 | 33 |
| U19 | 18,000 | 17,000 | 0.7/1.0/0.25/0.05/0 | 37 |
| U20 | 19,000 | 18,000 | 0.7/1.0/0.25/0.05/0 | 41 |
| U21 | 19,000 | 18,000 | 0.7/1.0/0.25/0.05/0 | 41 |
| U22 | 17,000 | 16,000 | 0.65/1.0/0.15/0.15/0.05 | 55 |
| U23 | 18,000 | 16,000 | 0.65/1.0/0.15/0.15/0.05 | 19 |
| U24 | 15,000 | 16,000 | 0.65/1.0/0.15/0.15/0.05 | 18 |
| U25 | 15,000 | 16,000 | 0.65/0.85/0.3/0.15/0.05 | 18 |
| U26 | 16,000 | 16,000 | 0.7/1.0/0.25/0/0 | 0 |
| U27 | 14,000 | 15,000 | 0.15/1.0/0/0.85/0 | 227 |
| U28-a | 2,200 | 2,200 | 0.67/1/0/0/0 | 0 |
| U28-b | 1,600 | 1,600 | 1/0.5/0/0/0 | 0 |
| U29-a | 2,300 | 2,300 | 0.67/1/0/0/0 | 0 |
| U29-b | 1,800 | 1,800 | 1/0.5/0/0/0 | 0 |

Example 1

The Preparation of the Photochromic Composition 20 g of THF as the organic solvent was added to 5 g of the urethane polymer (U1) having the polymerizable group, and while stirring at 60° C., it was dissolved by ultrasonic wave. After confirming that the urethane polymer (U1) having the polymerizable group was dissolved, it was cooled to a room temperature, then 0.25 g of photochromic compound (PC1) and 0.05 g of 0.001N hydrochloric acid aqueous solution as the polymerization initiator were added; thereby the photochromic composition was obtained by stir mixing.

(The Production of the Photochromic Laminated Article (the Optical Article))

The obtained photochromic composition was coated to the PET film (Purex film with silicone coating film made by Teijin DuPont Films Japan Limited.) and under the presence of the moist in the laboratory it was dried for 30 minutes at 50° C., thereby obtained the photochromic adhesive sheet having the thickness of 40 μm. Then, it was placed between two polycarbonate sheets having the thickness of 400 μm, and left for 24 hours at 40° C., and further heated for 60 minutes at 110° C. to obtain the laminated article having the photochromic characteristic of subject.

When the obtained photochromic laminated article was evaluated by the below described method, the initial adhesive strength was 130 N/25 mm, and 120 N/25 mm after the boiling test. Also, regarding the solvent resistance, for each polymerizable monomer composition, it was 1 by the following evaluation standard, thus it was excellent.

[The Evaluation Criteria; the Photochromic Laminated Article]

(The Adhesive Strength)

The obtained laminated article was made into the sample peace having the adhesive portion of 25×100 mm, and installed to the test machine (Autograph AG5000D, made by Shimadzu Corporation). The tensile test was carried out at the cross head speed of 100 mm/min, and measured the adhesive strength. The photochromic laminated article using the test sample was those before and after the boiling test. Note that the photochromic laminated article of the boiling test refers to the photochromic laminated article being left in the hot water for one hour.

(The Solvent Resistance)

The obtained photochromic laminated article was cut into a circular shape having a diameter of 65 mm, and immersed in various polymerizable monomer composition (Z1 to Z5) shown in the below for 12 hours then the appearance of the photochromic laminated article was evaluated by visual observation. Further, regarding the elution amount of the photochromic compound, it was quantified by high performance liquid chromatography. The evaluation standard was carried out based on 4 grades of 1 to 4 as shown in below.

(The Evaluation Standard of the Solvent Resistance)

1; the elution of the urethane resin and the photochromic compound are observed at least partially at the part of 0.2 mm or below from the end of the photochromic laminated article, but the releasing between the optical sheet and the photochromic adhesive layer is not observed. The elution amount of the photochromic compound was 0.5 wt % or less among the amount included in the entire photochromic laminated article.

2; the elution of the urethane resin and the photochromic compound are observed at least partially at the part of 0.5 mm or below from the end of the photochromic laminated article, but the releasing between the optical sheet and the photochromic adhesive layer is not observed. The elution amount of the photochromic compound was 1.0 mass % or less among the amount included in the entire photochromic laminated article.

3; the elution of the urethane resin and the photochromic compound are observed at least partially at the part of below than 1.0 mm from the end of the photochromic laminated article, but the releasing between the optical sheet and the photochromic adhesive layer is not observed. The elution amount of the photochromic compound was less than 2.0 mass % among the amount included in the entire photochromic laminated article.

4; the elution of the urethane resin and the photochromic compound are observed at least partially at the part of 1.0 mm or higher from the end of the photochromic laminated article, and the releasing between the optical sheet and the photochromic adhesive layer is observed. The elution amount of the photochromic compound was 2.0 wt % or more among the amount included in the entire photochromic laminated article.

(The Polymerizable Monomer Composition Used for the Evaluation of the Solvent Resistance)

Z1 (the acrylate monomer composition); the mixture of 20 parts by mass of trimethylolpropanetrimethacrylate, 40 parts by mass of polyethyleneglycoldiacrylate having the average molecular weight of 522 and 40 parts by mass of urethane acrylate (ECRYL 4858 made by DAICEL CORPORATION).

Z2 (the acryl monomer composition); diethyleneglycol-bisallylcarbonate

Z3 (thiourethane based monomer composition); the mixture of 100 parts by mass of dicyclohexylmethane-4,4'-diisocyanate, 63.0 parts by mass of 1,2-bis[(2-mercapto-ethyl)thio]-3-mercaptopropane.

Z4 (the urethane based monomer composition); the mixture of 100 parts by mass of polyester polyol having number average molecular weight of 1000 made of adipinic acid and 1,6-hexane diol, 78 parts by mass of isomer mixture of dicyclohexylmethane 4,4'-diisocyanate, and 17 parts by mass of 2,4-diamino-3,5-diethyl-toluene/2,6-diamino-3,5-diethyl-toluene.

Z5 (the thioepoxy based monomer composition); the mixture of 95 parts by mass of bis(β-epithiopropylthio) ethane, 5 parts by mass of 2-mercaptoethanol.

(The Production of Photochromic Lens (the Optical Article))

Next, the obtained photochromic laminated article was cut into a circular shape having the diameter of 65 mm and placed in the glass mold comprising the gasket (it was set to 0.00 D, the lens diameter of 70 mm, the thickness of 3.0 mm), and on the bottom and top of the laminated article placed which was in said glass mold, the mixture of 3 parts by mass of diisopropylperoxydicarbonate and 100 parts by mass of diethyleneglycolbisallylcarbonate were filled which was prepared as the themoplastic composition.

Said thermoplastic composition was placed in the glass mold of the air furnace, and the temperature was gradually increased from 40° C. to 90° C. over 20 hours, and it was held at 90° C. for 1 hour to carry out the polymerization. After completing the polymerization, the gasket and the mold were removed, and the heat treatment was carried out at 120° C. for 2 hours, thereby the photochromic lens was obtained.

When the obtained photochromic lens was evaluated based on the below method, the color optical density was 1.2, the color fading speed was 55 seconds and the durability was 95% as the photochromic characteristic. Also, the appearance of the obtained photochromic lens did not show the elution of the photochromic compound or the polyurethane resin, and the below evaluation standard was 1, which is good.

[The Evaluation Criteria; the Photochromic Lens]
(The Photochromic Characteristic)

By using the obtained photochromic lens as the sample, the light was irradiated to said sample for 120 seconds using Xenon Lamp L-2480 (300 W) SHL-100 made by Hamamatsu Photonics K.K. via Aeromass filter (made by Corning Incorporated) at 23° C., and the beam intensity of 365 nm=2.4 mW/cm$^2$, 245 nm=24 μW/cm$^2$ at the laminated surface for 120 seconds for the color development, and measured the photochromic characteristic of the photochromic lens.

The maximum absorption wave length (λmax): it is the maximum absorption wave length obtained from the spectrophotometer (Multichannel Photo Detector-MCPD1000) made by OTSUKA ELECTRONICS CO., LTD. Said maximum absorption wave length relates to the color tone during the color development.

The color optical density $\{\epsilon(120)-\epsilon(0)\}$: the difference between the absorbance $\epsilon(120)$ after irradiating for 120 seconds at said maximum absorption wave length and the absorbance $\epsilon(0)$ at no irradiation at the maximum absorption wave length. As this value is higher, it indicates that the photochromic property is further excellent.

The color fading speed $\{t\frac{1}{2}(sec.)\}$: the time required to reduce the absorbance at said maximum absorption wave length of the sample to be ½ when the light irradiation is stopped after 120 seconds irradiation. As this time is shorter, it indicates that the photochromic property is further excellent.

The durability (%)=$\{(A48/A0)\times100\}$: the accelerated deterioration test was carried out in order to evaluate the durability of the color development due to the light irradiation. That is, the obtained laminated article was carried out with the accelerated deterioration for 48 hours by Xenon Weather Meter X25 made by Suga Test Instrument Co., Ltd. Then, the evaluation of said color optical density was carried out before and after the test, and measured the color optical density before the test (A0) and the color optical density after the test (A48). The value obtained by $\{(A48)/A0\}\times100$ was determined as the remaining ratio (%), and defined as the standard of the durability of the color development. As the remaining ratio is higher, it indicates that the durability is higher.

(The Appearance Evaluation)

The obtained photochromic lens was evaluated by visual observation. The evaluation standard was carried out by 4 grades of 1 to 4 as shown in below.

1; the elution of the urethane resin and the photochromic compound are observed at least partially at the part of 0.2 mm or below from the end of the photochromic laminated article, but the releasing "between the optical sheet and the photochromic adhesive layer" and "between the optical sheet and the thermoplastic resin" are not observed.

2; the elution of the urethane resin and the photochromic compound are observed at least partially at the part of 0.5 mm or below from the end of the photochromic laminated article, but the releasing "between the optical sheet and the photochromic adhesive layer" and "between the optical sheet and the thermoplastic resin" are not observed.

3; the elution of the urethane resin and the photochromic compound are observed at least partially at the part of less than 1.0 mm from the end of the photochromic laminated article, but the releasing "between the optical sheet and the photochromic adhesive layer" and "between the optical sheet and the thermoplastic resin" are not observed.

4; the elution of the urethane resin and the photochromic compound are observed at least partially at the part of 1.0 mm or higher from the end of the photochromic laminated article, and either one of the releasing "between the optical sheet and the photochromic adhesive layer" or "between the optical sheet and the thermoplastic resin" are observed.

The results of the above are shown in Table 3 and 4.

Examples 2 to 40

Except for using the urethane polymer (the component A) having the polymerizable group, the isocyanate compound (the component C), the organic solvent (the component D), the polymerization initiator, and the monomer having the polymerizable group; the photochromic composition was prepared by the same method as the example 1. Note that, 5 parts (the actual used amount of 0.25 g) by mass of the photochromic compound (PC1) was used with respect to the urethane polymer (the component A) having the polymerizable group. The obtained photochromic composition was used for producing the photochromic laminated article by the same method as the example 1, and further the photochromic lens was produced. Note that, in case Irgacure 1800 (PC5) was used as the polymerization initiator, the photochromic laminated article was produced by the following step. The evaluation results of various photochromic laminated article obtained and the photochromic lens are shown in Table 4 and Table 6.

(The Production of the Photochromic Laminated Article (the Optical Article))

The obtained photochromic composition was coated to the PET film (Purex film with silicone coating film made by Teijin DuPont Films Japan Limited.), in the laboratory under the presence of the moist (23° C., the humidity of 50%), it was dried for 30 minutes at 50° C.; thereby obtained the photochromic adhesive sheet having the thickness of 40 μm. Next, the obtained photochromic adhesive sheet was placed between two polycarbonate sheets having a thickness of 400 μm, and left for 24 hours at 40° C., and further carried out the heat treatment for 60 minutes at 110° C.; then the light irradiation was carried out for three minutes using the metal halide lamp which is controlled to exhibit the output of 150 mW/cm$^2$ at 405 nm of the polycarbonate sheet surface; thereby the laminated article comprising the photochromic characteristic of object was obtained.

TABLE 3

| Example No. | Component A Type | Added amount (g) | Component C Type | Added amount (g) | Component D Type | Added amount (g) | Polymerization initiator Type | Added amount (g) |
|---|---|---|---|---|---|---|---|---|
| Example 1 | U1 | 5 | — | — | D2 | 20 | P1 | 0.05 |
| Example 2 | U2 | 5 | — | — | D1/D2 | 6/14 | P5 | 0.01 |
| Example 3 | U3 | 5 | — | — | D2 | 20 | P3 | 0.02 |
| Example 4 | U4 | 5 | — | — | D2 | 20 | P4 | 0.03 |
| Example 5 | U5 | 5 | — | — | D2 | 20 | P1 | 0.05 |
| Example 6 | U6 | 5 | — | — | D2 | 20 | P5 | 0.01 |
| Example 7 | U7 | 5 | — | — | D2 | 20 | P1 | 0.03 |
| Example 8 | U8 | 5 | — | — | D2 | 20 | P1 | 0.01 |
| Example 9 | U9 | 5 | — | — | D2 | 20 | P1 | 0.06 |
| Example 10 | U10 | 5 | — | — | D2 | 20 | P1 | 0.07 |
| Example 11 | U11 | 5 | — | — | D2 | 20 | P5 | 0.01 |
| Example 12 | U12 | 5 | — | — | D2 | 20 | P5 | 0.01 |
| Example 13 | U13 | 5 | — | — | D2 | 20 | P5 | 0.01 |
| Example 14 | U14 | 5 | — | — | D2 | 20 | P1 | 0.05 |
| Example 15 | U15 | 5 | — | — | D2 | 20 | P1 | 0.05 |
| Example 16 | U16 | 5 | — | — | D2 | 20 | P1 | 0.05 |
| Example 17 | U17 | 5 | — | — | D2 | 20 | P1 | 0.05 |
| Example 18 | U18 | 5 | — | — | D1/D2 | 6/14 | P1 | 0.05 |
| Example 19 | U19 | 5 | — | — | D2 | 20 | P1 | 0.05 |
| Example 20 | U20 | 5 | — | — | D2 | 20 | P1 | 0.05 |
| Example 21 | U21 | 5 | — | — | D2 | 20 | P1 | 0.05 |
| Example 22 | U22 | 5 | — | — | D1/D2 | 6/14 | P1 | 0.05 |
| Example 23 | U23 | 5 | — | — | D2 | 20 | P2 | 0.02 |
| Example 24 | U24 | 5 | — | — | D2 | 20 | P3 | 0.02 |
| Example 25 | U25 | 5 | — | — | D2 | 20 | P4 | 0.03 |
| Example 26 | U5 | 5 | C1 | 0.15 | D2 | 20 | P1 | 0.05 |
| Example 27 | U6 | 5 | C1 | 0.15 | D2 | 20 | P2 | 0.02 |
| Example 28 | U7 | 5 | C1 | 0.15 | D2 | 20 | P1 | 0.01 |
| Example 29 | U8 | 5 | C2 | 0.15 | D2 | 20 | P1 | 0.01 |
| Example 30 | U9 | 5 | C1 | 0.15 | D2 | 20 | P1 | 0.06 |
| Example 31 | U10 | 5 | C1 | 0.15 | D2 | 20 | P1 | 0.07 |
| Example 32 | U11 | 5 | C2 | 0.15 | D2 | 20 | P5 | 0.01 |
| Example 33 | U12 | 5 | C1 | 0.15 | D2 | 20 | P5 | 0.01 |
| Example 34 | U20 | 5 | C1 | 0.15 | D1/D2 | 6/14 | P1 | 0.05 |
| Example 35 | U21 | 5 | C1 | 0.15 | D2 | 20 | P1 | 0.05 |

TABLE 4

| Example No. | Adhesive strength (N/25 mm) Initial | Adhesive strength (N/25 mm) After boiling test | Solvent resistance Z1 | Z2 | Z3 | Z4 | Z5 | Photochromic characteristic λ max | Color optical density | Color fading speed | durability | Appearance |
|---|---|---|---|---|---|---|---|---|---|---|---|---|
| Example 1 | 130 | 120 | 1 | 1 | 1 | 1 | 1 | 585 | 1.2 | 55 | 95 | 1 |
| Example 2 | 130 | 120 | 1 | 1 | 1 | 1 | 1 | 585 | 1.1 | 55 | 94 | 1 |
| Example 3 | 125 | 120 | 1 | 1 | 1 | 1 | 1 | 585 | 1.1 | 50 | 93 | 1 |
| Example 4 | 125 | 115 | 1 | 1 | 1 | 1 | 1 | 585 | 1.1 | 50 | 93 | 1 |
| Example 5 | 130 | 115 | 1 | 1 | 1 | 1 | 1 | 585 | 1.2 | 50 | 98 | 1 |
| Example 6 | 130 | 120 | 1 | 1 | 1 | 1 | 1 | 585 | 1.1 | 50 | 98 | 1 |
| Example 7 | 120 | 110 | 1 | 1 | 1 | 1 | 1 | 585 | 1.2 | 50 | 97 | 1 |
| Example 8 | 105 | 90 | 2 | 2 | 2 | 2 | 2 | 585 | 1.1 | 50 | 95 | 2 |
| Example 9 | 140 | 130 | 1 | 1 | 1 | 1 | 1 | 585 | 1.1 | 55 | 98 | 1 |
| Example 10 | 150 | 135 | 1 | 1 | 1 | 1 | 1 | 585 | 1.1 | 55 | 98 | 1 |
| Example 11 | 120 | 110 | 1 | 1 | 1 | 1 | 1 | 585 | 1.1 | 55 | 98 | 1 |
| Example 12 | 110 | 100 | 1 | 1 | 1 | 1 | 1 | 585 | 1.1 | 60 | 98 | 1 |
| Example 13 | 90 | 80 | 1 | 1 | 1 | 1 | 1 | 585 | 1.1 | 65 | 98 | 1 |
| Example 14 | 100 | 90 | 1 | 1 | 1 | 1 | 1 | 585 | 1.2 | 80 | 95 | 1 |
| Example 15 | 110 | 100 | 1 | 2 | 1 | 1 | 2 | 585 | 1.1 | 65 | 95 | 1 |
| Example 16 | 120 | 110 | 1 | 2 | 1 | 1 | 1 | 585 | 1.1 | 55 | 95 | 1 |
| Example 17 | 120 | 110 | 1 | 2 | 1 | 1 | 1 | 585 | 1.1 | 45 | 95 | 1 |
| Example 18 | 115 | 105 | 1 | 2 | 1 | 1 | 2 | 585 | 1.1 | 40 | 90 | 1 |
| Example 19 | 120 | 110 | 1 | 2 | 1 | 1 | 1 | 585 | 1.1 | 55 | 95 | 1 |
| Example 20 | 120 | 110 | 1 | 2 | 1 | 1 | 1 | 585 | 1.1 | 55 | 95 | 1 |
| Example 21 | 120 | 110 | 1 | 2 | 1 | 1 | 1 | 585 | 1.1 | 55 | 95 | 1 |
| Example 22 | 125 | 110 | 1 | 2 | 1 | 1 | 1 | 585 | 1.1 | 50 | 98 | 1 |
| Example 23 | 120 | 105 | 1 | 2 | 1 | 1 | 2 | 585 | 1.2 | 50 | 98 | 2 |
| Example 24 | 120 | 110 | 1 | 2 | 1 | 1 | 2 | 585 | 1.1 | 50 | 98 | 2 |
| Example 25 | 120 | 110 | 1 | 2 | 1 | 1 | 2 | 585 | 1.1 | 50 | 98 | 2 |
| Example 26 | 150 | 140 | 1 | 1 | 1 | 1 | 1 | 585 | 1.2 | 50 | 98 | 1 |
| Example 27 | 150 | 140 | 1 | 1 | 1 | 1 | 1 | 585 | 1.1 | 50 | 98 | 1 |
| Example 28 | 120 | 100 | 2 | 2 | 2 | 2 | 2 | 585 | 1.2 | 50 | 95 | 2 |
| Example 29 | 130 | 110 | 1 | 2 | 2 | 2 | 2 | 585 | 1.1 | 50 | 95 | 1 |
| Example 30 | 170 | 160 | 1 | 1 | 1 | 1 | 1 | 585 | 1.1 | 55 | 98 | 1 |
| Example 31 | 180 | 165 | 1 | 1 | 1 | 1 | 1 | 585 | 1.1 | 55 | 98 | 1 |
| Example 32 | 140 | 130 | 1 | 1 | 1 | 1 | 1 | 585 | 1.1 | 55 | 98 | 1 |
| Example 33 | 125 | 110 | 1 | 1 | 1 | 1 | 1 | 585 | 1.1 | 60 | 98 | 1 |
| Example 34 | 140 | 115 | 1 | 2 | 1 | 1 | 1 | 585 | 1.1 | 55 | 95 | 1 |
| Example 35 | 145 | 115 | 1 | 2 | 1 | 1 | 1 | 585 | 1.1 | 55 | 95 | 1 |

TABLE 5

| Example and Comparative example No. | Component A Type | Component A Added amount (g) | Component C Type | Component C Added amount (g) | Component D Type | Component D Added amount (g) | Polymerizable monomer Type | Polymerizable monomer Added amount (g) | mol number of polymerizable group (mmol/100 g) | Polymerization initiator Type | Polymerization initiator Added amount (g) |
|---|---|---|---|---|---|---|---|---|---|---|---|
| Example 36 | U1 | 5 | — | — | D2 | 20 | M1 | 0.4 | 173 | P1 | 0.08 |
| Example 37 | U1 | 5 | — | — | D2 | 20 | M2 | 0.3 | 171 | P1 | 0.08 |
| Example 38 | U5 | 5 | — | — | D2 | 20 | M2 | 0.3 | 193 | P1 | 0.08 |
| Example 39 | U2 | 5 | — | — | D1/D2 | 6/14 | M3 | 0.16 | 50 | P5 | 0.01 |
| Example 40 | U3 | 5 | — | — | D2 | 20 | M4 | 0.25 | 62 | P3 | 0.06 |
| Comparative example 1 | U26 | 5 | — | — | D2 | 20 | — | — | 0 | — | — |
| Comparative example 2 | U27 | 5 | — | — | D2 | 20 | — | — | 227 | P5 | 0.04 |

TABLE 6

| Example and Comparative example No. | Adhesive strength (N/25 mm) Initial | Adhesive strength (N/25 mm) After boiling test | Solvent resistance Z1 | Z2 | Z3 | Z4 | Z5 | Photochromic characteristic λ max | Color optical density | Color fading speed | durability | Appearance |
|---|---|---|---|---|---|---|---|---|---|---|---|---|
| Example 36 | 140 | 130 | 1 | 1 | 1 | 1 | 1 | 585 | 1.0 | 55 | 95 | 1 |
| Example 37 | 140 | 135 | 1 | 1 | 1 | 1 | 1 | 585 | 1.1 | 55 | 95 | 1 |

TABLE 6-continued

| Example and Comparative example No. | Adhesive strength (N/25 mm) | | Solvent resistance | | | | | Photochromic characteristic | | | | |
|---|---|---|---|---|---|---|---|---|---|---|---|---|
| | Initial | After boiling test | Z1 | Z2 | Z3 | Z4 | Z5 | λ max | Color optical density | Color fading speed | durability | Appearance |
| Example 38 | 130 | 120 | 1 | 1 | 1 | 1 | 1 | 585 | 1.2 | 50 | 98 | 1 |
| Example 39 | 150 | 140 | 1 | 1 | 1 | 1 | 1 | 585 | 1.0 | 55 | 95 | 1 |
| Example 40 | 130 | 125 | 1 | 1 | 1 | 1 | 1 | 585 | 1.1 | 55 | 94 | 1 |
| Comparative example 1 | 80 | 30 | 3 | 3 | 2 | 3 | 3 | 585 | 1.1 | 55 | 90 | 3 |
| Comparative example 2 | 30 | 20 | 1 | 1 | 1 | 1 | 1 | 585 | 1.0 | 65 | 93 | 1 |

The Comparative Example 1 and 2

Except for using the urethane polymer shown in Table 5, the photochromic composition was prepared by the same method as the example 1. Note that, 5 parts (the actual used amount of 0.25 g) by mass of the photochromic compound (PC1) and tetrahydrofuran (the organic solvent, the component D; the actual used amount 20 g) were used with respect to the urethane polymer (the component A) having the polymerizable group. The obtained photochromic composition was used for producing the photochromic laminated article by the same method as the example 1, and further the photochromic lens was produced. The evaluation results of various photochromic laminated article obtained and the photochromic lens are shown in Table 6.

The Comparative Example 3

The urethane prepolymer (U28-a) having the isocyanate group at the end terminal of the molecular chain, and the urethane prepolymer (U28-b) having the hydroxyl group at the end terminal of the molecular chain were prepared by the below method.
(The Preparation of the Urethane Prepolymer (U28-a))
  211 g of polyol compound (PL3:polypropylene glycol) having the number average molecular weight of 700, and 118 g of dicyclohexylmethane 4,4'-diisocyanate (NCO2) were added into the three-necked flask having a stirring blade, a cooling pipe, a thermometer, and nitrogen gas introducing pipe; and reacted under nitrogen atmosphere at 80° C. for 9 hours to obtain the urethane prepolymer (U28-a) having NCO group at the end terminal. The molecular weight of the obtained urethane polymer (U28-a) having the polymerizable group was 2200 (the theoretical value: 2200) in terms of polystyrene.
(The Preparation of the Urethane Prepolymer (U28-b))
  241 g of polyol compound (PL3:polypropylene glycol) having the number average molecular weight of 700, and 30 g of toluene-2,4-diisocyanate (NCO3) were added into the three-necked flask having a stirring blade, a cooling pipe, a thermometer, and nitrogen gas introducing pipe; and reacted under nitrogen atmosphere at 80° C. for 9 hours to obtain the urethane prepolymer (U28-b) having OH group at the end terminal. The molecular weight of the obtained urethane polymer (U28-b) having the polymerizable group was 1600 (the theoretical value: 1600) in terms of polystyrene.
  The urethane prepolymer (U28-a) and the urethane prepolymer (U28-b) obtained as such were used in the blending amount shown in Table 7, and 20 g of THF (D2) as the organic solvent and 0.25 g of the photochromic compound (PC1) were used; thereby the photochromic composition was prepared by the same method as the example 1. Also, by using the obtained photochromic composition, the photochromic laminated article was produced as the same method as the example 1. The evaluation result is shown in Table 7. Note that, the preparation condition of the used urethane polymer is shown in Table 1, and the ratio of each component of the urethane polymer and other physical properties are shown in Table 2.

The Comparative Example 4

The urethane prepolymer (U29-a) having the isocyanate group at the end terminal of the molecular chain, and the urethane prepolymer (U29-b) having the hydroxyl group at the end terminal of the molecular chain were prepared by the below method.
(The Preparation of the Urethane Prepolymer (U29-a))
  289 g of polyol compound (PL1:polycarbonatediol) having the number average molecular weight of 800, and 120 g of isophorone diisocyanate (NCO1) were added into the three-necked flask having a stirring blade, a cooling pipe, a thermometer, and nitrogen gas introducing pipe; and reacted under nitrogen atmosphere at 80° C. for 9 hours to obtain the urethane prepolymer (U29-a) having NCO group at the end terminal. The molecular weight of the obtained urethane polymer (U29-a) having the polymerizable group was 2300 (the theoretical value: 2300) in terms of polystyrene.
(The Preparation of the Urethane Prepolymer (U29-b))
  276 g of polyol compound (PL1:polycarbonatediol) having the number average molecular weight of 800, and 30 g of toluene-2,4-diisocyanate (NCO3) were added into the three-necked flask having a stirring blade, a cooling pipe, a thermometer, and nitrogen gas introducing pipe; and reacted under nitrogen atmosphere at 80° C. for 9 hours to obtain the urethane prepolymer (U29-b) having OH group at the end terminal. The molecular weight of the obtained urethane polymer (U29-b) having the polymerizable group was 1800 (the theoretical value: 1800) in terms of polystyrene.
  The urethane prepolymer (U29-a) and the urethane prepolymer (U29-b) obtained as such were used in the blending amount shown in Table 7, and 20 g of THF (D2) as the organic solvent and 0.25 g of the photochromic compound (PC1) were used; thereby the photochromic composition was prepared by the same method as the example 1. Also, by using the obtained photochromic composition, the photochromic laminated article was produced as the same method as the example 1. the evaluation result was shown in Table 7. Note that, the preparation condition of the used urethane polymer is shown in Table 1, and the ratio of each component of the urethane polymer and other physical properties are shown in Table 2.

The Comparative Example 5

The Preparation of the Photochromic Composition

The photochromic composition using (meth)acrylate monomer was prepared by the method of the below method. As the (meth)acrylate monomer, 2,2-bis(4-methacryloyloxypentaethoxyphenyl)propane/polyethyleneglycolacrylate (average molecular weight 532)/trimethylolpropanetrimethacrylate/urethane oligomer hexaacrylate (U-6HA, the molecular weight of 1019, made by Shin-Nakamura Chemical Co., Ltd)/glycidylmethacrylate were blended in the blending ratio of 40 g/10 g/25 g/20 g/5 g. To this mixture of (meth)acrylate monomer of 5 g, 0.25 g of the photochromic compound (PC1) were added and mixed thoroughly, then 0.015 g of Iragacure 1800 {the mixture of 1-hydroxycyclohexylphenylketone and bis(2,6-dimethoxybenzoyl)-2,4,4-trimethyl-pentylphosphine oxide (the weight ratio of 3:0} as the polymerization initiator, and mixed thoroughly. The mol number of the polymerizable group included in the photochromic composition was 510 mmol per 100 g of the entire component having the polymerizable group.

(The Production of the Photochromic Laminated Article (the Optical Article))

The obtained photochromic adhesive sheet was coated between two polycarbonate sheets having a thickness of 400 μm by a spin coat method, and the light irradiation was carried out for three minutes using the metal halide lamp which is controlled to exhibit the output of 150 mW/cm² at 405 nm of the polycarbonate sheet surface to cure the coated membrane. The membrane thickness of this thin membrane which allows to obtain the lens coated with this surface can be controlled by the condition of the spin coat. The membrane thickness for this case was about 40 μm. To this surface of the photochromic composition obtained as such, one more polycarbonate sheet was placed on, and left for 24 hours at 40° C., and further the heat applying treatment was carried out for 60 minutes for 110° C. However, the obtained photochromic laminated article has no adhesiveness, and it was easily released by a hand. Thus, no further evaluation was carried out.

(the component A) having the polymerizable group and the photochromic compound (the component B) which are prepared in accordance with the present invention, excellent photochromic characteristic, the adhesive strength (the adhesiveness) and the heat resistance are exhibited.

On the other hand, for the comparative examples 1, 3 and 4, the solvent resistance is insufficient, and the initial adhesive strength and that of after the boiling test were not sufficient since the urethane polymer without the polymerizable group is used.

The comparative example 2 used the urethane polymer having large amount of polymerizable group, and the comparative example 5 used a photochromic composition using (meth)acrylate monomer; hence the adhesiveness between the optical sheet and the photochromic adhesive layer were not achieved.

The invention claimed is:

1. A photochromic composition, comprising:
   an urethane polymer (A) having a polymerizable group within a molecule,
   a photochromic compound (B),
   an isocyanate compound (C) having at least one isocyanate group within a molecule, and
   an optional monomer having the polymerizable group,
   wherein said urethane polymer (A) is a prepolymer obtained by reacting:
   a polyol compound (A1) of a number average molecular weight of 400 to 3000 having two or more of hydroxyl groups within a molecule,
   a polyisocyanate compound (A2) having two or more isocyanate groups within a molecule,
   a chain extender (A3) of a molecular weight of 50 to 300 having two or more groups capable of reacting with isocyanate group in a molecule, and
   a compound (A4) being a polymerizable group imparting compound which can introduce the polymerizable group at the end terminal of said urethane polymer (A),
   wherein said polymerizable group is any one selected from the group consisting of silanol group or a group capable of forming a silanol group by hydrolysis, (meth)acrylate group, epoxy group, and vinyl group,

TABLE 7

| Comparative example No. | Urethane polymer | | Urethane polymer | | Component D | | Adhesive strength (N/25 mm) | |
|---|---|---|---|---|---|---|---|---|
| | Type | Added amount (g) | Type | Added amount (g) | Type | Added amount (g) | Initial | After boiling test |
| Comparative example 3 | U28-a | 4.2 | U28-b | 0.8 | D2 | 20 | 50 | 35 |
| Comparative example 4 | U29-a | 4.2 | U29-b | 0.8 | D2 | 20 | 50 | 40 |

| Comparative example No. | Solvent resistance | | | | | Photochromic characteristic | | | | Appearance |
|---|---|---|---|---|---|---|---|---|---|---|
| | Z1 | Z2 | Z3 | Z4 | Z5 | λ max | Color optical density | Color fading speed | Durability | |
| Comparative example 3 | 4 | 4 | 3 | 3 | 4 | 585 | 1.1 | 50 | 80 | 4 |
| Comparative example 4 | 4 | 4 | 3 | 3 | 4 | 585 | 1.1 | 50 | 80 | 4 |

As obvious from said examples 1 to 40, regarding the photochromic composition mixing the urethane polymer wherein an amount ratio of (A1) component, (A2) component, (A3) component, and (A4) component used for obtaining said urethane polymer (A) is n1:n2:n3:n4=0.33 to 0.85:1:0.1 to 0.65:0.01 to 0.3; and n1+n3+n4=1, wherein:

a total mol number of the hydroxyl group included in said (A1) component is n1, a total mol number of isocyanate group included in said (A2) component is n2, a total mol number of a group capable of reacting with isocyanate group included in said (A3) component is n3, and a total mol number of a group capable of reacting with isocyanate group included in said (A4) component is n4, and wherein a mol number of the polymerizable group per 100 gram of a total of said urethane polymer (A) and said optional monomer is (1) 10 mmol or more and 250 mmol or less, in case the polymerizable group is a silanol group or a group forming the silanol group by hydrolysis;

(2) 10 mmol or more and 200 mmol or less, in case the polymerizable group is (meth)acrylate group, epoxy group, or vinyl group.

2. The photochromic composition as set forth in claim 1 further comprising a polymerization initiator.

3. The photochromic composition as set forth in claim 1 wherein a molecular weight of said isocyanate compound (C) is 100 or more and less than 1000.

4. The photochromic composition as set forth in claim 1 further comprising an organic solvent (D).

5. The photochromic composition as set forth in claim 1 wherein 0.1 to 20 parts by mass of said photochromic compound (B) is included with respect to 100 parts by mass of said urethane polymer (A).

6. The photochromic composition as set forth in claim 1 wherein 0.1 to 20 parts by mass of said photochromic compound (B) and 0.1 to 30 parts by mass of monomer having the polymerizable group are included with respect to 100 parts by mass of said urethane polymer (A).

7. The photochromic composition as set forth in claim 1 further including 0.1 to 20 parts by mass of said isocyanate compound (C) with respect to 100 parts by mass of said urethane polymer (A).

8. The photochromic composition as set forth in claim 4 further including 5 to 900 parts by mass of the organic solvent (D) with respect to 100 parts by mass of said urethane polymer (A).

9. An optical article having a laminated structure by binding two optical sheets or optical films facing against each other via an adhesive layer comprising the photochromic composition as set forth in claim 1.

10. The optical article as set forth in claim 9 wherein at least one of said two optical sheets or the optical films facing against each other in said laminated structure is made of polycarbonate resin.

11. A production method of a photochromic laminated sheet, comprising:

preparing a photochromic adhesive sheet comprising the urethane polymer (A), the photochromic compound (B), and the optional monomer having the polymerizable group blended, by removing the organic solvent (D) by drying after extending the photochromic composition as set forth in claim 4 on the flat and smooth base material, then further releasing the flat and smooth base material, and making a laminated structure by polymerizing the polymerizable group after binding two optical sheets or the optical films by placing said photochromic adhesive sheet between the two optical sheets or the optical films facing against each other.

12. A photochromic laminated sheet, comprising:

two optical sheets or optical films facing each other;

an adhesive layer comprising the photochromic composition as set forth in claim 1 between the two optical sheets or optical films, thereby binding the two optical sheets or optical films and forming a laminate structure.

13. A production method of a photochromic laminated sheet, comprising:

(1) preparing a photochromic adhesive sheet comprising:
applying the photochromic composition as set forth in claim 4 on a flat and smooth base material,
drying to remove the organic solvent; and
releasing the base material;

(2) placing the adhesive sheet between two optical sheets or optical films facing each other, thereby binding the two optical sheets or optical films; and (3) polymerizing the polymerizable group, thereby making a laminated structure.

* * * * *